United States Patent
Mizuno

(10) Patent No.: US 8,112,520 B2
(45) Date of Patent: Feb. 7, 2012

(54) METHOD OF ASSIGNING SERVICE AND INFORMATION PROCESSING APPARATUS FOR IMPLEMENTING THE METHOD

(75) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 12/633,147

(22) Filed: Dec. 8, 2009

(65) Prior Publication Data
US 2010/0153545 A1    Jun. 17, 2010

(30) Foreign Application Priority Data
Dec. 17, 2008  (JP) ................................. 2008-321478

(51) Int. Cl.
*G06F 15/173* (2006.01)
(52) U.S. Cl. ........ 709/224; 709/221; 709/229; 709/231; 365/221
(58) Field of Classification Search .................. 709/224, 709/229, 221, 231; 365/221
See application file for complete search history.

(56) References Cited

U.S. PATENT DOCUMENTS

| | | | |
|---|---|---|---|
| 6,985,936 B2 * | 1/2006 | Agarwalla et al. | 709/221 |
| 7,146,424 B2 * | 12/2006 | Douceur et al. | 709/231 |
| 7,664,864 B2 * | 2/2010 | Ball et al. | 709/229 |
| 2007/0104007 A1 * | 5/2007 | Mizuno | 365/221 |

FOREIGN PATENT DOCUMENTS
JP    2000-322161    11/2000
* cited by examiner

*Primary Examiner* — Tammy Nguyen
(74) *Attorney, Agent, or Firm* — Fitzpatrick, Cella, Harper & Scinto

(57) ABSTRACT

To provide a method for assigning a service wherein power consumption can be reduced, and an information processing apparatus for implementing the method. The method includes: receiving a request of a service provided by a device connected to a network; checking whether or not a device providing the requested service is in a sleep state; selecting a device to be used based on the checked sleep state of the device, a service table that stores a combination of a service provided via the network and a device connected to the network and providing the service, and a power consumption table that stores a device connected to the network and power consumption of the device, under conditions of a time until the service is provided and power consumption; and issuing an instruction of providing the service to the selected device.

15 Claims, 21 Drawing Sheets

FIG. 5

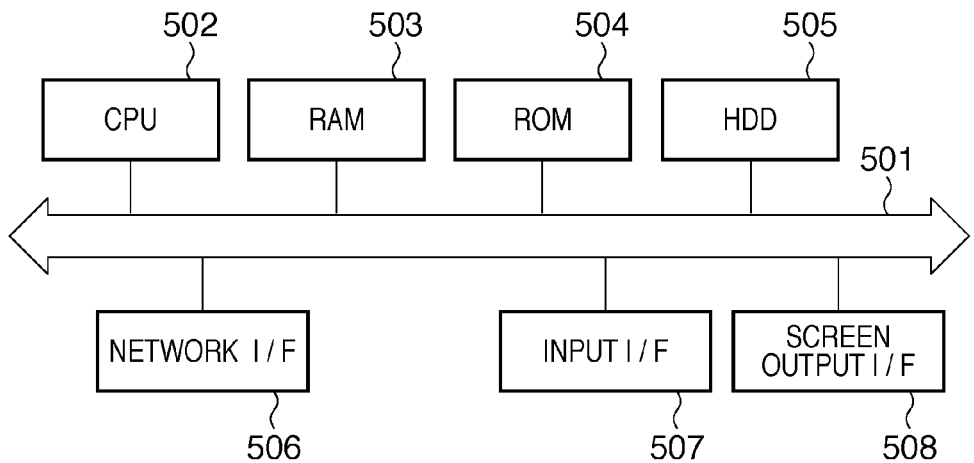

FIG. 6

| | SERVICE | PROVIDING MACHINE | MODEL | SLEEP LEVEL | PERFORMANCE |
|---|---|---|---|---|---|
| 606 | FAX | machine 1 (192.168.18.5) | device A | 1 | G3 |
| | FAX | machine 3 (192.168.21.101) | device C | 1 | G4 |
| 607 | OCR | machine 2 | device B | 1 | JP |
| | OCR | machine 4 | device D | 1 | JP, EN |
| 608 | PRINT | machine 1 | device A | 0 | A3, Color |
| | PRINT | machine 2 | device B | 0 | A4, B/W |
| | PRINT | machine 3 | device C | 0 | A3, B/W |
| | PRINT | machine 4 | device D | 0 | A3, Color |
| 609 | SCAN | machine 4 | device D | 0 | 600dpi, Color |
| 610 | SEND | machine 2 | device B | 0 | JPEG, TIFF |
| | SEND | machine 4 | device D | 1 | JPEG, TIFF |
| 611 | FORMAT CONVERSION | machine 3 | device C | 1 | PDF |
| | FORMAT CONVERSION | machine 5 | PC | - | JPEG, PDF |

FIG. 7

| MODEL | SLEEP LEVEL | POWER CONSUMPTION |
|---|---|---|
| device A | 0<br>1<br>2 | 1800W<br>800W<br>1W |
| device B | 0<br>2 | 650W<br>1W |
| device C | 0<br>1<br>2 | 1400W<br>600W<br>1W |
| device D | 0<br>1<br>2 | 2000W<br>900W<br>1W |

FIG. 9

| | SERVICE | PROVIDING MACHINE | MODEL | SLEEP LEVEL | PERFORMANCE |
|---|---|---|---|---|---|
| 606a | FAX | machine 1 | device A | 1 | G3 |
| 606b | FAX | machine 3 | device C | 1 | G4 |

| DEVICE LIST | TOTAL POWER CONSUMPTION | REQUIRED POWER CONSUMPTION |
|---|---|---|
| machine 1, machine 2 | | |
| machine 1, machine 4 | | |
| machine 2, machine 3 | | |
| machine 3, machine 4 | | |

|  | 1001 | 1002 | 1003 |
|---|---|---|---|
|  | DEVICE LIST | TOTAL POWER CONSUMPTION | REQUIRED POWER CONSUMPTION |
|  | machine 1, machine 2 | 1450W |  |
|  | machine 1, machine 4 | 1700W |  |
|  | machine 2, machine 3 | 1250W |  |
|  | machine 3, machine 4 | 1500W |  |

FIG. 16

| DEVICE LIST | TOTAL POWER CONSUMPTION | REQUIRED POWER CONSUMPTION |
|---|---|---|
| machine 1 | 1800W | |
| machine 1, machine 3 | 2400W | |

FIG. 17A

| DEVICE | SLEEP LEVEL |
|---|---|
| machine 1 | 2 |
| machine 3 | 2 |

FIG. 17B

| DEVICE | SLEEP LEVEL |
|---|---|
| machine 1 | 0 |
| machine 3 | 2 |

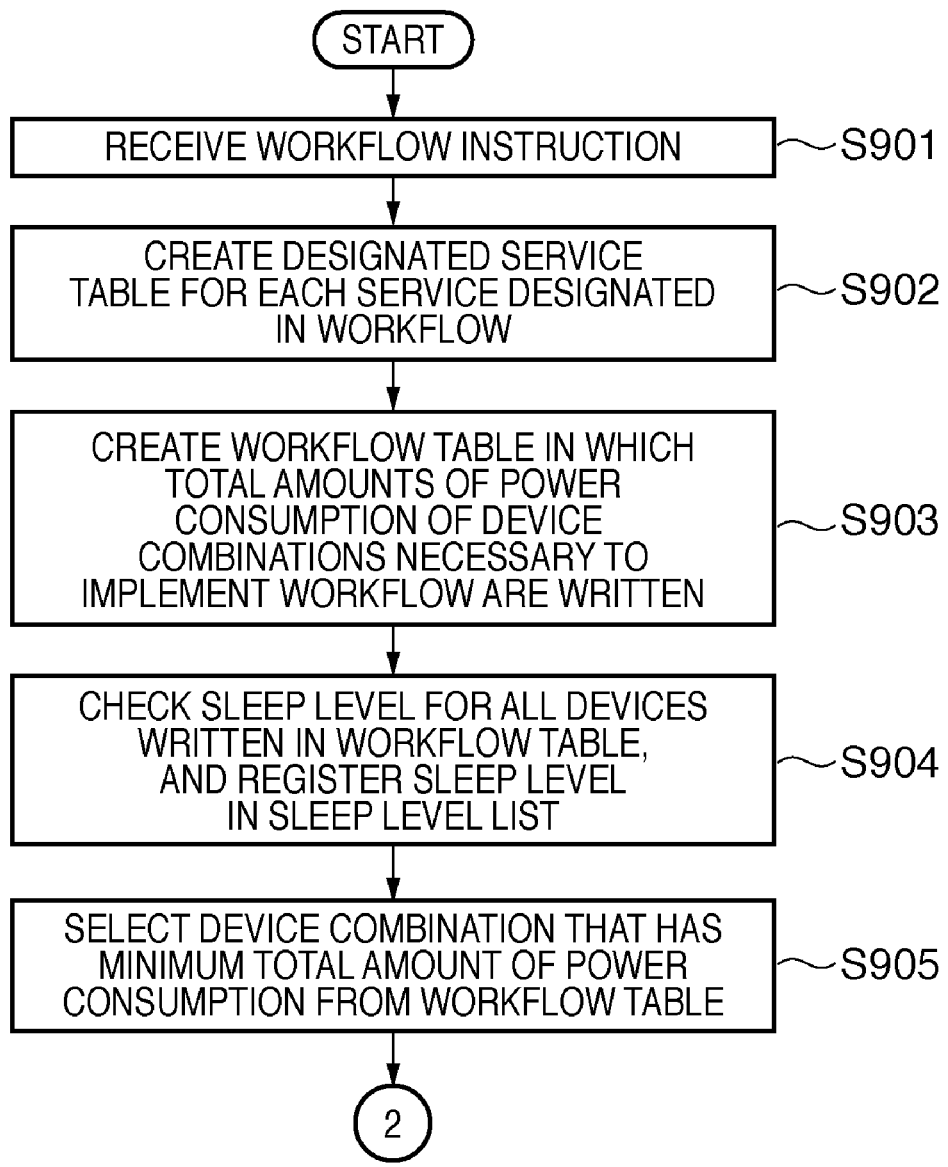

F I G. 18C
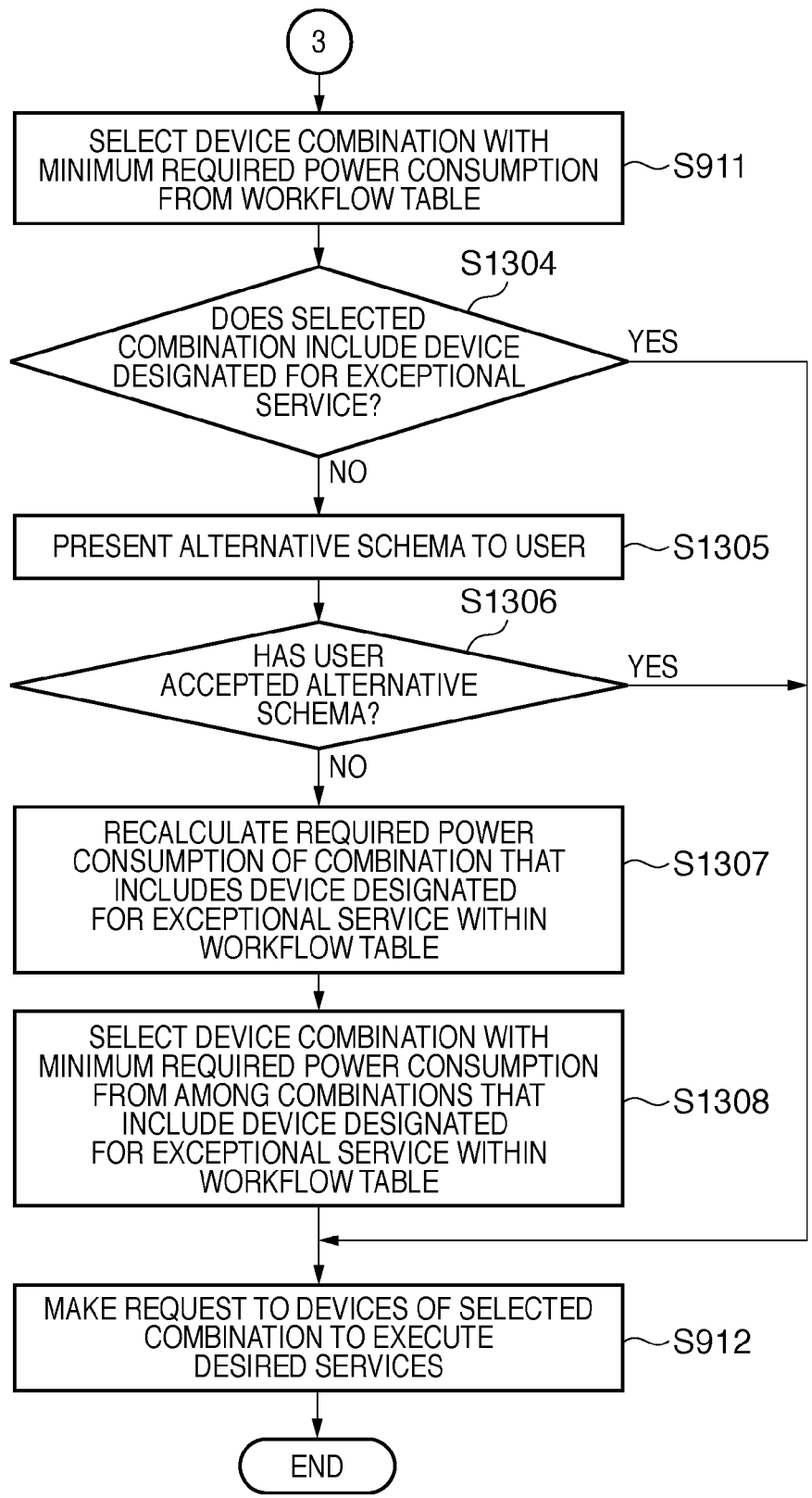

FIG. 19

| DEVICE LIST | TOTAL POWER CONSUMPTION | REQUIRED POWER CONSUMPTION |
|---|---|---|
| machine 1(F, P) | 1800W | |
| machine 1(F), machine 2(P) | 1450W | |
| machine 1(P), machine 3(F) | 2400W | |
| machine 1(F), machine 3(P) | 2200W | |
| machine 1(F), machine 4(P) | 2800W | |
| machine 2(P), machine 3(F) | 1250W | |
| machine 3(F, P) | 1400W | |
| machine 3(F), machine 4(P) | 2600W | |

2801 points to the "machine 1(F), machine 4(P)" row.
2802 points to the "machine 3(F), machine 4(P)" row.

FIG. 20

| DEVICE | SLEEP LEVEL |
|---|---|
| machine 1 | 0 |
| machine 2 | 0 |
| machine 3 | 1 |
| machine 4 | 2 |

F I G. 22

METHOD OF ASSIGNING SERVICE AND INFORMATION PROCESSING APPARATUS FOR IMPLEMENTING THE METHOD

BACKGROUND OF THE INVENTION

1. Field of the Invention

The present invention relates to a method of assigning a service and an information processing apparatus for implementing the method. For example, the present invention relates to a method of assigning a service with which services distributed on a network are combined and provided as a service framework while taking power consumption into consideration, and an information processing apparatus for implementing the method. More specifically, the present invention relates to a method of assigning a service that efficiently consumes the power of devices that provide the service, and an information processing apparatus for implementing the method.

2. Description of the Related Art

Along with the advancement of network technologies in recent years, the number of server devices, as information processing apparatuses, that provide such a service framework is increasing. In such a service framework, services that are distributively provided over a network are combined and provided as a new service, or a plurality of services are provided as a workflow of tasks.

As a supply source of such services, not only servers and computers, but also image forming apparatuses increasingly provide a variety of services along with the trend toward image forming apparatuses with more functionality and higher performance. Examples of services provided by image forming apparatuses include, in addition to conventional services such as a print service and a fax service, an OCR (optical character recognition) service, a document format conversion service, and so on.

In terms of energy conservation, techniques for reducing power consumption are applied to image forming apparatuses, such as, for example, enabling the printer engine itself to operate at low power levels, or incorporating a mechanism that causes the apparatus to go into a sleep mode when not in use so as to achieve power conservation.

Sleep mode refers to a mode in which the image forming apparatus automatically reduces the power supplied to each component apparatus thereof when, for example, the image forming apparatus is not used for a prescribed period of time. The component apparatuses that are operated at reduced power are, for example, a display panel, a printer engine, and so on. When used during a sleep mode, the image forming apparatus restarts power supply to each component apparatus that was operating at reduced power and starts processing.

Moreover, the sleep mode may be a set of a plurality of modes according to the sleep status, rather than a single mode. For example, the image forming apparatus goes into a first sleep state when not in use for a prescribed period of time, and switches to a second sleep state when not in use for another prescribed period of time after the first sleep state. Here, the first sleep state is a mode that reduces power supply to the component apparatuses that can soon return from the sleep state when power supply is restarted. The second sleep state is a mode that reduces power supply to the component apparatuses that require a warm-up time or the like, or in other words, that require some time to return from the sleep state, such as a printer engine. Generally, power consumption of the second sleep state is reduced below that of the first sleep state, and the second sleep state requires more time from which to return.

A method for reducing the power consumption of a plurality of image forming apparatuses connected to a network is disclosed in, for example, Japanese Patent Laid-Open No. 2000-322161. According to this method, the load of an entire network to which a plurality of image forming apparatuses are connected is measured. The load is the amount of processing requested per unit time, and can be, for example, the number of printed pages per minute. Then, the image forming apparatuses connected to the network are controlled so as to go into a sleep state such that the load value does not fall below a value provided by the entire network while minimizing the power consumption.

The above conventional technique, however, controls the image forming apparatuses so as to go into a sleep state according to a load value that varies from time to time, and does not give consideration to the image forming apparatuses automatically going into a sleep mode. Accordingly, it is not possible to control power consumption so as to reduce it to a minimum according to the services provided by individual image forming apparatuses.

The above problem is not limited to image forming apparatuses, and such a problem occurs similarly in many apparatuses that have a sleep mode.

SUMMARY OF THE INVENTION

In view of the above problems, the present invention provides a method of assigning a service that is capable of reducing power consumption by selecting a device, when executing a service provided by devices connected to a network, with the minimum power consumption to execute the service from among the devices that provide the service according to sleep state and power consumption, and releasing the selected device from a sleep state; and an information processing apparatus for implementing the method.

In order to solve the above problems, an information processing apparatus of the present invention for controlling services provided by a plurality of devices connected to a network, the apparatus comprises: a service table that stores a combination of a service provided via the network and a device connected to the network and providing the service; a power consumption table that stores a device connected to the network and power consumption of the device; a service reception unit configured to receive a request of a service provided by a device connected to the network; a sleep check unit configured to check whether or not the device connected to the network and providing the requested service is in a sleep state; a device search unit configured to select a device to be used based on the sleep state of the device checked by the sleep check unit, the service table and the power consumption table under a condition of a time until the service is provided and power consumption of the selected device; and a service instruction unit configured to issue an instruction of providing the service to the device connected to the network and selected by the device search unit.

The present invention also provides a method of assigning a service to be provided to a plurality of devices connected to a network, in a case which a service table that stores a combination of a service provided via the network and a device connected to a network and providing the service, and a power consumption table that stores a device connected to the network and power consumption of the device are prepared, the method comprising: a service reception step of receiving a request of a service provided by a device connected to the network; a sleep check step of checking whether or not the device connected to the network and providing the requested service is in a sleep state; a device search step of selecting a device to be used based on the sleep state of the device checked in the sleep check step, the service table and the power consumption table under conditions of a time until the service is provided and power consumption of the selected device; and a service instruction step of issuing an instruction of providing the service to the device connected to the network and selected in the device search step.

According to the present invention, when executing a service provided by devices connected to a network, it is possible to select a device with the minimum power consumption to execute the service from among the devices that provide the service according to sleep state and power consumption, and release the selected device from a sleep state. Accordingly, power consumption can be reduced.

Further features of the present invention will become apparent from the following description of exemplary embodiments with reference to the attached drawings.

BRIEF DESCRIPTION OF THE DRAWINGS

FIG. 5 is a block diagram showing an exemplary configuration of a server apparatus according to an embodiment of the present invention.

FIG. 6 is a diagram showing an example of a service table according to an embodiment of the present invention.

FIG. 7 is a diagram showing an example of a power consumption table according to an embodiment of the present invention.

FIG. 9 is a diagram showing an example of a designated service table according to an embodiment of the present invention.

FIG. 10 is a diagram showing an example of an initial state of a workflow table according to an embodiment of the present invention.

FIG. 12 is a diagram showing an example of a workflow table according to an embodiment of the present invention obtained after calculating total power consumption.

FIG. 16 is a diagram showing an example of a workflow table that includes a device designated by an exceptional service according to an embodiment of the present invention obtained after calculating total power consumption.

FIG. 17A is a diagram showing an example of a sleep level list used to illustrate a specific example of an embodiment of the present invention.

FIG. 17B is a diagram showing another example of a sleep level list used to illustrate a specific example of an embodiment of the present invention.

FIGS. 18A-18C are a flowchart showing an exemplary process procedure for presenting an alternative schema to execute an exceptional service with a device other than the device designated for the exceptional service according to an embodiment of the present invention.

FIG. 19 is a diagram showing an example of a workflow table according to an embodiment of the present invention obtained after calculating total power consumption in the case of presenting an alternative schema to execute a service with a device other than a designated device.

FIG. 20 is a diagram showing an example of a sleep level list used to illustrate a specific example of an embodiment of the present invention.

FIG. 22 is a diagram showing an example of a workflow table in the case of enqueuing a plurality of workflows according to an embodiment of the present invention.

DESCRIPTION OF THE EMBODIMENTS

Hereinafter, embodiments of the present invention will be described in detail with reference to the accompanying drawings.

Figure 1:
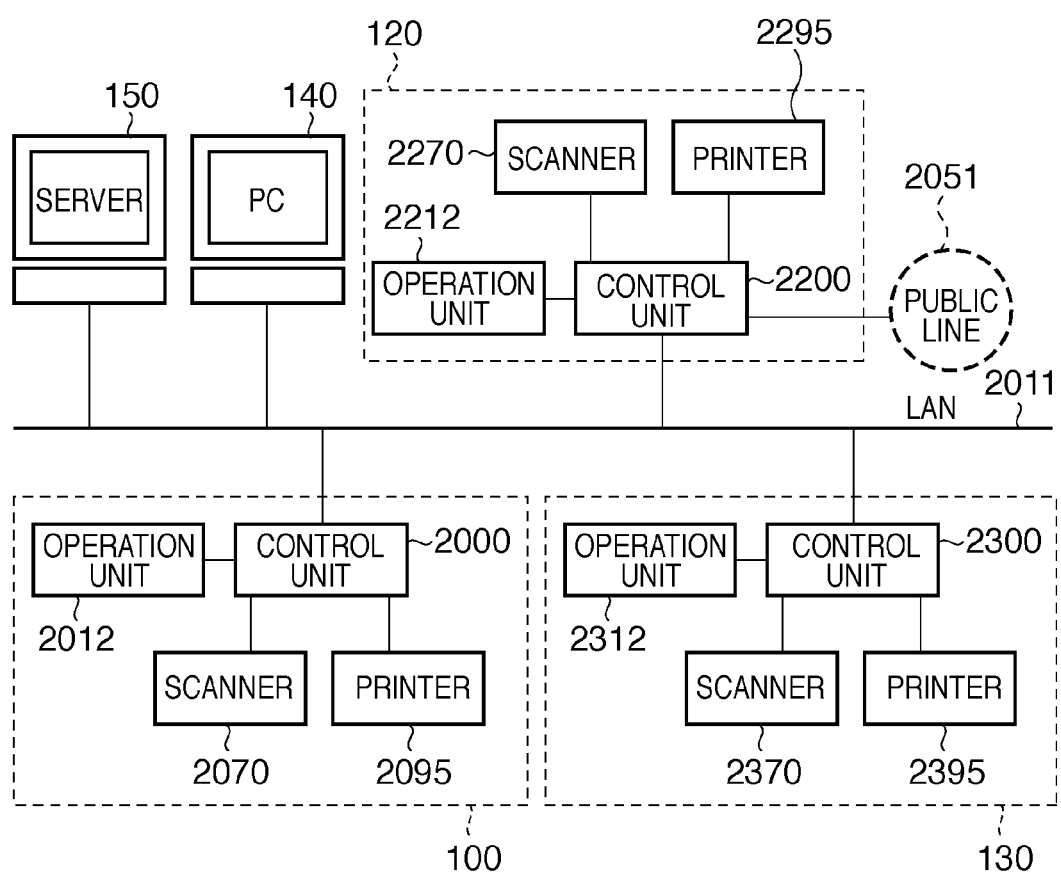
FIG. 1 is a block diagram showing an exemplary overall configuration of an image forming system according to an embodiment of the present invention.

Exemplary Configuration of Service Providing System According to Present Embodiment FIG. 1 is a block diagram illustrating an overall configuration of a service providing system according to the present embodiment.

An image forming apparatus 100 includes a scanner unit 2070 serving as an image input device, a printer unit 2095 serving as an image output device, a control unit 2000, and an operation unit 2012 that is a user interface. The scanner unit 2070, the printer unit 2095 and the operation unit 2012 are each connected to the control unit 2000. The control unit 2000, which is connected to a network transmission path such as a LAN 2011, a public line 2051 and the like, provides its functions to other devices as services. The public line 2051 is capable of transmitting and receiving data via G3 and G4 faxes, including the transmission of color images.

Also, other image forming apparatuses 120 and 130 that have the same device configuration as that of the image forming apparatus 100 are connected to the LAN 2011. The image forming apparatuses 120 and 130 respectively include a scanner unit 2270, 2370, a printer unit 2295, 2395 and an operation unit 2212, 2312, which are connected to a control unit 2200, 2300. The image forming apparatuses shown in FIG. 1 have both a printer function and a scanner function, but it is also possible to use, for example, an image forming apparatus that has only a printer function or an image forming apparatus that has only a scanner function.

A personal computer (hereinafter referred to as PC) 140 that is capable of transmitting and receiving files using FTP, SMB protocol or the like as well as emails is also connected to the LAN 2011. A server apparatus 150 organizes services provided by the plurality of image forming apparatuses that are connected to the LAN 2011, combines them as a single service, or executes a workflow containing such services.

Although not illustrated, the apparatuses that provide services are not limited to image forming apparatuses, and another server that provides services may be connected to the LAN 2011. Also, the services handled by the server apparatus 150 are not limited to services available through the LAN 2011, and may include services available through the public line (WAN) 2051 such as the Internet.

Figure 2:
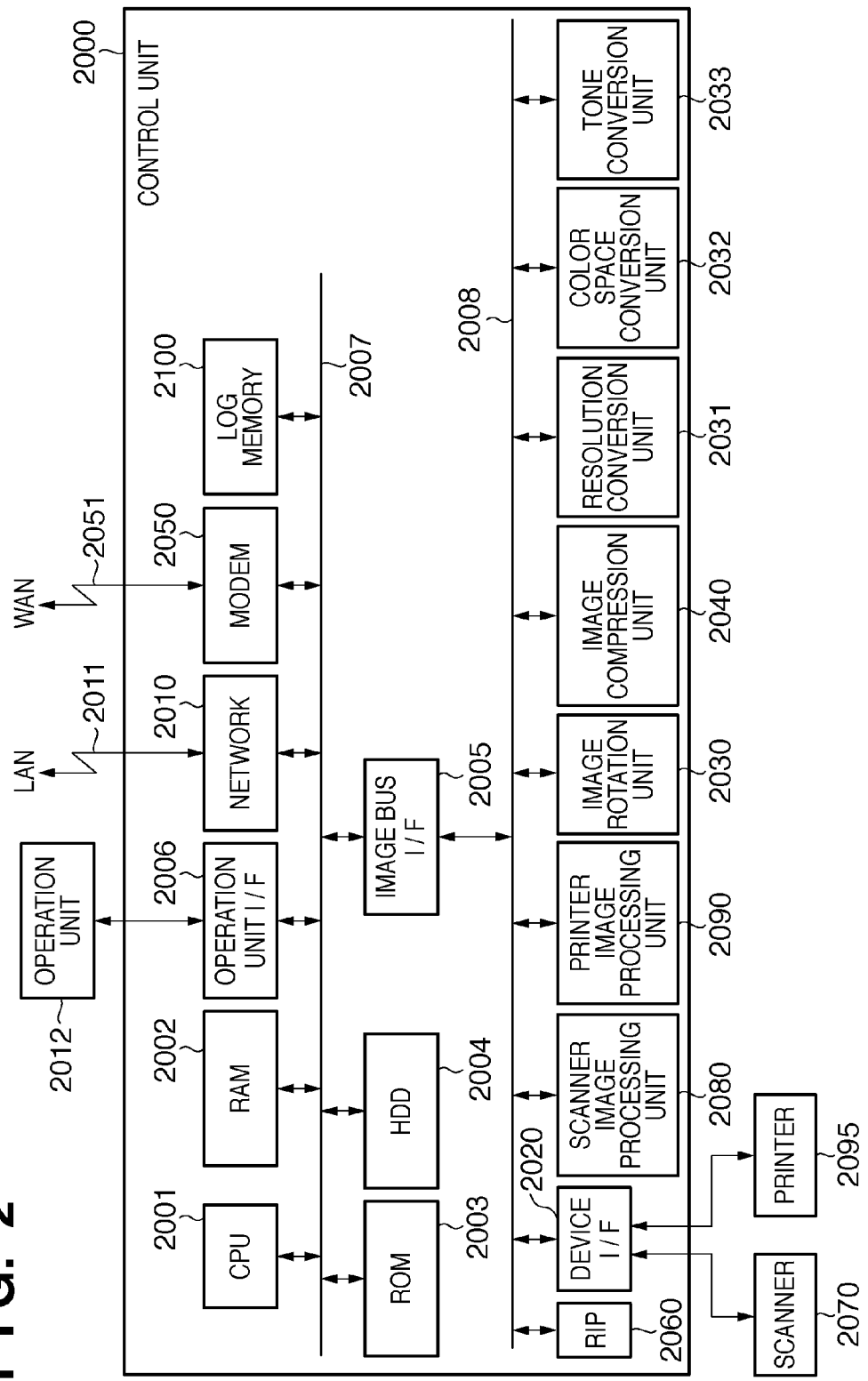
FIG. 2 is a block diagram showing an exemplary overall configuration of an image forming apparatus according to an embodiment of the present invention.

Exemplary Control Configuration of Image Forming Apparatus According to Present Embodiment FIG. 2 is a block diagram used to illustrate an exemplary control configuration of an image forming apparatus according to the present embodiment.

The control unit 2000 is connected to the scanner 2070 serving as an image input device and the printer 2095 serving as an image output device. The control unit 2000 is also connected to the LAN 2011 and the public line (WAN) 2051 so that image information and device information are input and output.

A CPU 2001 of the control unit 2000 is a controller that controls the entire system. A RAM 2002 is a system work memory for operating the CPU 2001, and is also an image memory for temporarily storing image data. The RAM 2002 may be disposed so as to operate programs such as an operating system, system software and application software. A ROM 2003 is a boot ROM in which a system boot program is stored. In addition, a system program and an application program may also be stored in the ROM 2003. A HDD 2004 is a hard disk drive on which system software, application software, image data and the like are stored. Although not illustrated, in the case of a small-format image forming apparatus, instead of the HDD 2004, it is possible to employ a configuration without a hard disk by storing system software, application software and the like in the ROM 2003.

A log memory 2100 is a memory for storing logs in which various logs such as an error log and an operating status log are stored. Instead of preparing the log memory 2100, it is possible to use a mechanism in which part of the RAM 2002 is used as a log memory. An operation unit I/F 2006, which is an interface unit with the operation unit (UI) 2012, outputs image data to be displayed on the operation unit 2012 to the operation unit 2012, and conveys information input through the operation unit 2012 by a user of the system to the CPU 2001. A network 2010, which is connected to the LAN 2011, inputs and outputs information. A modem 2050, which is connected to the public line (WAN) 2051, inputs and outputs image information. The devices described thus far are located on a system bus 2007.

An image bus I/F 2005 is a bus bridge that connects the system bus 2007 and an image bus 2008 for transferring image data at high speeds and that converts data structures. The image bus 2008 is configured of a PCI bus or the like. The following devices are located on the image bus 2008.

A raster image processor (RIP) 2060 expands PDL code into a bitmap image. A device I/F unit 2020 connects the scanner 2070 serving as an image input device and the printer 2095 serving as an image output device to the control unit 2000, and converts image data of synchronous systems and asynchronous systems. A scanner image processing unit 2080 corrects, processes and edits input image data. The scanner image processing unit 2080 also has a function of determining whether an input image is color or monochrome based on a chromatic signal of the image and storing the result. A printer image processing unit 2090 corrects, processes and edits image data to be output.

An image rotation unit 2030 reads an image from the scanner in cooperation with the scanner image processing unit. The image rotation unit 2030 is also capable of rotating an image and storing it in a memory, or printing out an image stored in a memory while rotating it in cooperation with the printer image processing unit. A resolution conversion unit 2031 performs resolution conversion processing on an image stored in a memory and stores it in the memory. A color space conversion unit 2032 converts, for example, a YUV image stored in a memory into a Lab image by a matrix operation, and stores the image in the memory. A tone conversion unit 2033 converts, for example, an 8-bit, 256-grayscale image stored in a memory into a 1-bit, 2-grayscale image by a technique such as an error diffusion process, and stores the 1-bit, 2-grayscale image in the memory. An image compression unit 2040 compresses and decompresses multi-valued image data into and from JPEG format, and compresses and decompresses binary image data into and from JBIG, MMR, MR or MH format. The image rotation unit 2030, the resolution conversion unit 2031, the color space conversion unit 2032, the tone conversion unit 2033 and the image compression unit 2040 are capable of operating in conjunction with each other. For example, when an image rotation process and a resolution conversion process are performed on an image stored in a memory, both processes can be executed without the involvement of the memory.

In the above description, image processing such as image rotation is performed by a device connected to the image bus 2008. However, such image processing may be executed by the CPU 2001 by storing image processing software on the HDD 2004 or the ROM 2003 and reading the software into the RAM 2002. Also, it is needless to say that the software executed is not limited to software for image processing, and any processing software may be executed as long as the processing is required by the image forming apparatus. The programs stored in the ROM 2003 may be executed without being read into the RAM 2002.

Figure 3:
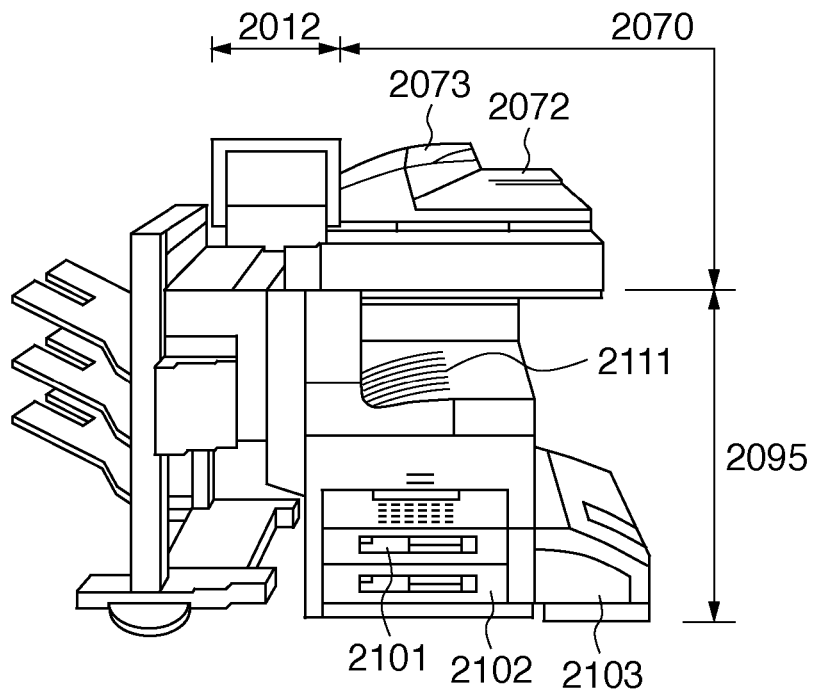
FIG. 3 is an external perspective view of an input/output device of the image forming apparatus according to an embodiment of the present invention.

Exemplary Configuration of Image Forming Apparatus According to Present Embodiment FIG. 3 is a perspective view showing an exemplary configuration of an image forming apparatus according to the present embodiment.

The scanner unit 2070 serving as an image input device illuminates an image on paper serving as an original, scans the image with a CCD line sensor (not shown) and thereby converts the image into an electrical signal as raster image data. An original paper is placed on a tray 2073 of an original feeder 2072, and a user of the apparatus provides an instruction to read the original through the operation unit 2012. Then, the CPU 2001 of the control unit 2000 provides an instruction to the scanner 2070, the feeder 2072 feeds the original paper sheet by sheet, and an operation of reading the original image is performed.

The printer unit 2095 as an image output device is a unit that converts raster image data into an image on paper. As such a conversion method, there are an electrophotographic method that employs a photoconductive drum or photoconductive belt, an inkjet method that discharges ink from a micro-nozzle array to print an image directly onto paper, and so on, but any method can be used. A print operation starts with an instruction from the CPU 2001 of the control unit 2000. The printer unit 2095 includes a plurality of paper supply trays so that different paper sizes and different paper orientations can be selected, and paper cassettes 2101, 2102 and 2103 that correspond to the trays. A paper discharge tray 2111 is a unit that receives printed paper.

(Example of Operation Unit 2012)

Figure 4:
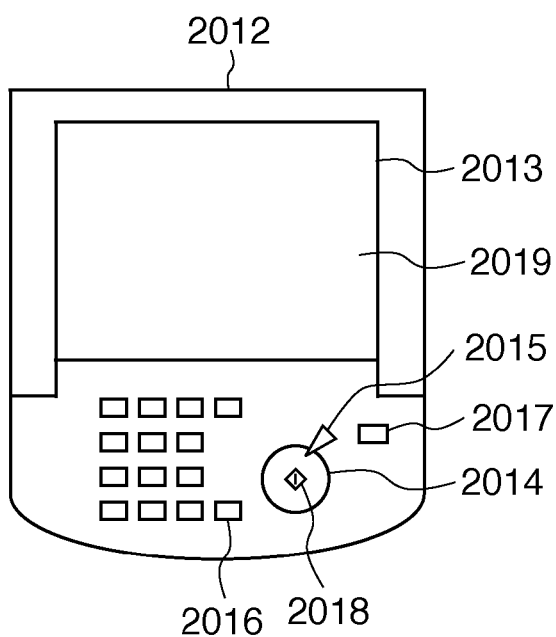
FIG. 4 is an external view of a display unit of the image forming apparatus according to an embodiment of the present invention.

FIG. 4 shows an exemplary configuration of the operation unit 2012.

An LCD display unit 2013, in which a touch panel sheet 2019 is attached onto an LCD, displays system operation screens and soft keys and, when a displayed key is pressed, conveys the position information of the key to the CPU 2001 of the control unit 2000. A start key 2014 is used when starting an operation of reading an original image, or the like. The center portion of the start key 2014 includes a two-color (green and red) LED 2018 that indicates whether the start key 2014 is ready for use by using the colors. A stop key 2015 functions to stop ongoing operation. An ID key 2016 is used when a user inputs a user identifier. A reset key 2017 is used when initializing settings through the operation unit. The configuration of the image forming apparatus is, of course, not limited to that shown in FIGS. 2, 3 and 4 as long as the requirements of the present invention are satisfied.

Exemplary Sleep State of Image Forming Apparatus According to Present Embodiment Transitioning to a sleep state and returning from the sleep state of an image forming apparatus of the present embodiment will be described now.

The CPU 2001 of the control unit 2000 monitors time by using a timer (not shown) incorporated in the control unit 2000. When a prescribed period of time passes after the end of the preceding operation, the CPU 2001 issues an instruction to control power supply to a predetermined component apparatus of the control unit 2000, which transitions to a sleep state. The time period after the end of the preceding operation, and the component apparatuses of the control unit 2000 to which such an instruction is issued have been preset as image forming apparatus settings, and recorded, for example, on the HDD 2004 or the like. Such setting can be made by the administrator or a user of the image forming apparatus. The number of setting items is not limited to one, and there can be a plurality of setting items according to the sleep mode, such as the time period after the end of the preceding operation, and the component apparatuses of the control unit 2000 in which power supply is to be controlled.

Returning from the sleep state is performed under the following conditions. When a user operates the image forming apparatus through the operation unit 2012, a processing instruction is conveyed from the operation unit I/F 2006 to the CPU 2001. In response to such an operation, the CPU 2001 transmits an instruction to return from the sleep state to each component apparatus in which power supply is controlled. The apparatus that has received the instruction to return from the sleep state prepares itself for the restart of power supply and to be used. Such an operation from the user may be performed not only through the operation unit 2012, but also via the LAN 2011 or the WAN 2051, such as, for example, by receiving a print instruction from the PC 140 through the network or receiving a fax. In the case of the LAN 2011, a processing instruction is conveyed to the CPU 2001 via the network 2010. In the case of the WAN 2051, a processing instruction is conveyed to the CPU 2001 via the modem 2050.

In the case where the CPU 2001 determines a return from a sleep state, the CPU 2001 itself cannot transition to a sleep state because the CPU 2001 needs to manage the sleep state. Accordingly, the apparatuses that receive operations from the user (the operation unit I/F 2006, the network 2010 and the modem 2060) may each have a proxy response function for the CPU 2001. In this case, even when the CPU 2001 is in a sleep state, an operation instruction is received by the proxy response function of one of the apparatuses, the CPU 2001 is caused to return from the sleep state, and a request for processing is made to the CPU 2001.

At this time, one of the proxy response functions may determine whether or not to cause the CPU 2001 to return from the sleep mode according to the sleep state and the instructed operation. For example, if a print instruction is received via the LAN 2011, the CPU 2001 is caused to return. If, on the other hand, an instruction to check the sleep state is received, the proxy response function of the network 2010 responds to the instruction without causing the CPU 2001 to return. Also, in the case where there are a plurality of sleep modes, a configuration may be employed in which, rather than completely escaping from a sleep state as a return from the sleep state, a transition may be made to a sleep state in which power consumption is more than the current state but is less than a normal state. For example, if a process that does not involve printing (e.g., data storage) is requested while the printer engine, the CPU and the HDD are in a sleep state, only the CPU and the HDD are caused to return from the sleep state without causing the printer engine to return from the sleep state.

It was stated above that the HDD 2004 of FIG. 2 stores system software, application software and image data on the inside thereof, but the software and data stored thereon are not limited thereto, and the HDD 2004 is capable of storing general data files other than images such as data for image management, and data managed by the image forming apparatus. Examples of data managed by the image forming apparatus include setting information for transition to a sleep state described above, and so on.

Exemplary Configuration of Server Apparatus According to Present Embodiment

FIG. 5 is a block diagram showing an exemplary control configuration of a server apparatus as an information processing apparatus according to the present embodiment.

The server apparatus 150 includes a CPU 502 that controls the server apparatus 150, a RAM 503 that is a system work memory used for the operation of a data work area, a program, an OS and the like, and a ROM 504 in which a program for booting the system, a fixed program and the like are stored. These elements are connected to a system bus 501.

A hard disk drive (HDD) 505 in which system software, application software, data and the like are stored is also connected to the system bus 501. A network I/F 506 that is connected to a LAN so as to communicate with the LAN, an input I/F 507 that connects input devices such as a mouse and a keyboard, and a screen output I/F 508 that connects a display and the like.

(Service Framework)

A service framework possessed by the server apparatus 150 will be described now.

A service framework manages which service is provided where in the network. Upon receiving an instruction to perform a service from a user, the server apparatus 150 makes a request for processing to a service supply source that provides the service. In addition, the server apparatus 150 not only provides individual services, but also functions as a server for processing a workflow in which a plurality of services are combined.

In an example of a workflow, a plurality of services are performed in a combined manner, such as, for example, scanning an original and converting the scanned data into JPEG format, and saving the scanned original on a predetermined server and transmitting it by fax. As a function of the service framework, the server apparatus 150 can distribute a workflow to other PCs and image forming apparatuses. The PCs and image forming apparatuses to which a workflow has been distributed make a request to the server apparatus 150 as a distribution source to execute the workflow when the workflow is executed by a user.

The present embodiment is described in the context where there is one server apparatus 150 in which such a service framework functions. However, it is also possible to employ a configuration in which the services and workflows provided by a plurality of server apparatuses are executed in cooperation with other server apparatuses by communicating with each other. With this configuration, for example, a server apparatus can execute a service provided by a server apparatus that is located on the Internet with the use of a protocol that enables communication through the Internet such as HTTP.

(Exemplary Configuration of Service Table)

The server apparatus 150 stores a service table that shows which service is provided where (in which device). An example of the service table will be described with reference to FIG. 6. The service table is generated by the RAM 503, and stored on the HDD 505.

A column 601 indicates an available service, and a column 602 indicates a service providing machine. In FIG. 6, an example is shown in which, for example, fax service providing machines are specified with network IP addresses, but the configuration is not limited to the use of an IP address, and other parameters can be used as long as it is possible to specify a machine. In the following description, providing machines are referred to as machine 1, machine 2, and so on. A column 603 indicates the model of a service providing machine.

A column 604 indicates a sleep level at which a return is necessary to carry out the service. As used herein, "sleep level" refers to a value for a component apparatus in which power supply is controlled. For the sake of simplicity, the present embodiment will be described by using three sleep levels. Sleep level "0" refers to a non-sleep state, or in other words, a state in which power is supplied to all component apparatuses of an image forming apparatus. Sleep level "1" refers to a state in which power supply to the printer engine that consumes a large amount of power is stopped, but power is supplied to other component apparatuses of an image forming apparatus. Sleep level "3" refers to a state in which power is not supplied to almost all component apparatuses of an image forming apparatus, and power is supplied only to the operation unit I/F 2006, the network 2010 and the modem 2060 so as to enable a proxy response function. Such three states are merely an example of the present embodiment, and it is possible to more finely divide such sleep levels, or to have two levels that indicate a sleep state or a non-sleep state.

There are cases where the sleep level differs from device to device. In such a case, most detailed sleep levels are written in a service table, and different sleep levels are mapped into the already existing levels. For example, if there is a device that has only two levels indicating a sleep state or a non-sleep state, the sleep state corresponds to sleep level 2, and the non-sleep state corresponds to sleep level 0.

A column 605 indicates performance information for carrying out each service.

In the example shown in FIG. 6, two devices, namely, device A and device C, provide a fax service, and their IP addresses are 192.168.18.5 and 192.168.21.101, respectively. To implement the fax service, a transition to sleep level 1 is necessary. Fax services 606 indicate that, as regards performance, device A is capable of G3 fax transmissions, and device C is capable of G4 fax transmissions. Likewise, reference numeral 607 indicates an OCR service, 608 indicates a print service, 609 indicates a scan service, 610 indicates a send service, and 611 indicates a format conversion service.

Here, a service written in the column 601 is provided by the corresponding device written in the providing machine column 602 and the model column 603. The apparatus in the last line of the table that provides a format conversion service 611 is not an image forming apparatus, but an ordinary PC, so PC is written in model 603. It can be seen from this table that an image processing apparatus (machine 3) is capable of format conversion to PDF format from Adobe Systems Incorporated, and the PC (machine 5) is capable of format conversion to JPEG format, in addition to PDF format. In the following description, for the sake of simplicity, the process of the present embodiment will be described using only image processing apparatuses, but it is clear that the service providing machines are not limited to image processing apparatuses.

Such a service table is generated as follows, for example. The server apparatus 150 transmits, for example, a broadcast message that requires information necessary to create a service table to all devices on the network. Each service providing machine transmits information necessary to create a service table to the server apparatus 150. A service table is generated from the thus-obtained information. Alternatively, the administrator of the server apparatus or service framework may manually input necessary information to construct a service table.

Exemplary Configuration of Power Consumption Table

The server apparatus 150 stores another table that shows power consumption for each device model, and this table is called a power consumption table. The power consumption table will be described with reference to FIG. 7. The power consumption table is also generated by the RAM 503 and stored on the HDD 505.

A column 701 indicates the model of a service providing machine, which is the same as the model column 603 of the service table shown in FIG. 6. A column 702 indicates the same sleep level as in the sleep level column 604 of FIG. 6. In the power consumption table, the sleep levels that can be taken by each image forming apparatus are stored. A column 703 indicates power consumption, and the maximum power consumption for each sleep level 702 is written.

Specifically, a line 704 indicates three sleep levels that can be taken by device A including "0", "1" and "2" with the maximum power consumptions being 1.8 KW, 800 W and 1 W, respectively. A line 705 indicates two sleep levels that can be taken by device B including "0" and "2" with the maximum power consumptions being 650 W and 1 W, respectively. A line 706 indicates three sleep levels that can be taken by device C including "0", "1" and "2" with the maximum power consumptions being 1.4 KW, 600 W and 1 W, respectively. A line 707 indicates three sleep levels that can be taken by device D including "0", "1" and "2" with the maximum power consumptions being 2.0 KW, 900 W and 1 W.

Such a power consumption table may be created by the administrator of a service framework by manually inputting values. Alternatively, because service providing machines, that is, image forming apparatuses, are determined in the service table of FIG. 6, an inquiry may be made to relevant image forming apparatuses so as to obtain the power consumption of each service level as device information, and a power consumption table may be generated automatically.

Example 1 of Power Conservation Service According to Present Embodiment

Figure 8:
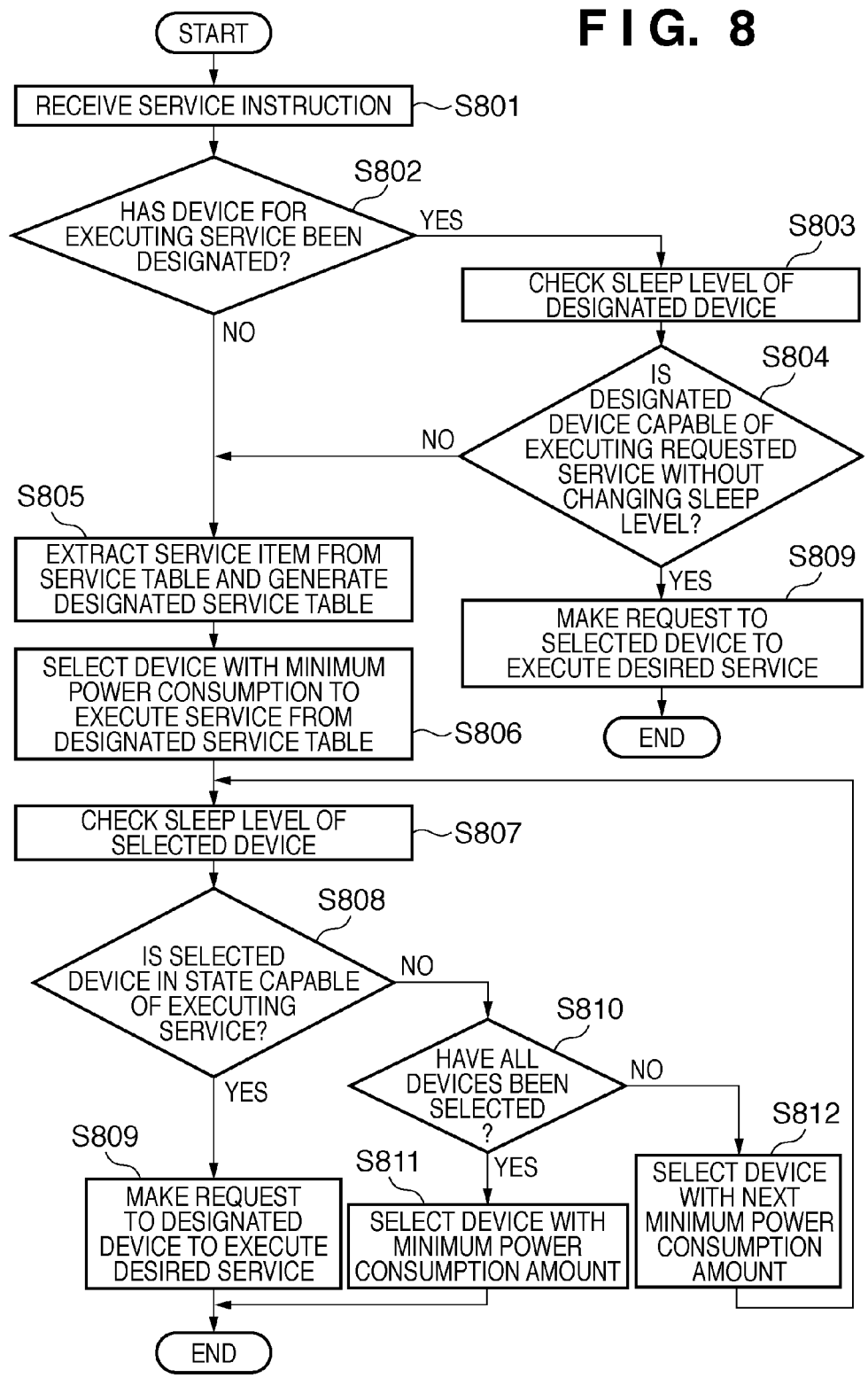
FIG. 8 is a flowchart showing an exemplary process procedure for making a request to a device with the minimum power consumption to execute a received service according to an embodiment of the present invention.

Exemplary Operation Procedure 1 of Power Conservation Service According to Present Embodiment An exemplary operation procedure of a power conservation service in the assignment of a service to a device connected to the network of the present embodiment will be described below with reference to FIG. 8. The flowchart of FIG. 8 is stored in the ROM 504 or on the HDD 505 of the server apparatus 150 of FIG. 5, and is executed by the CPU 502.

First, in Step S801, the CPU 502 receives (service reception) an instruction (service instruction) to execute a service requested from a user. As used herein, "user" also encompasses a machine that utilizes a service of the server apparatus 150, such as another server apparatus, a computer, or a device such as an image forming apparatus. In Step S802, the CPU 502 analyzes the service instruction received in Step S801, and determines whether or not a device for executing the service has been designated. If no device has been designated (No in Step S802), the CPU 502 proceeds to Step S805. If a device has been designated (Yes in Step S802), the CPU 502 proceeds to Step S803.

In Step S803, the CPU 502 checks (sleep check) the current sleep level of the device designated to execute the service from the result of analyzing the service instruction in Step S802. In Step S804, the CPU 502 checks the service table stored on the HDD 505, and compares the sleep level of the designated device to provide the service and the current sleep level obtained in Step S803. As a result of comparison, if the current sleep level obtained in Step S803 is less than or equal to the sleep level checked with the service table, it is unnecessary to change the sleep state to execute the service with the designated device (Yes in Step S804). That is, if the current sleep level of the designated device is "0", it means that it is also possible to provide services available at sleep levels "1" and "2". If the sleep level is "1", it means that it is also possible to provide a service available at sleep level "2". In this case, the CPU 502 proceeds to Step S809. In Step S809, the CPU 502 requests that the device designated execute the service designated by the service instruction, and ends the process. In Step S809, a designated device is selected as having the highest priority to provide a service.

If, on the other hand, it has been determined in Step S804 that the sleep level obtained in Step S803 is larger than the sleep level of the service of the designated device (No in Step S804), the CPU 502 proceeds to Step S805 to change the sleep state of the device. In Step S805, the CPU 502 extracts only devices that provide the service designated in the service instruction from the service table stored on the HDD 505, and generates a designated service table, a specific example of which will be described below with reference to FIG. 9.

In Step S806, the CPU 505 compares, for each item of the designated service table generated in Step S805, the combination of model name and sleep level against the power consumption table stored in the HDD 505, and selects the device with the minimum power. In Step S807, the CPU 505 checks the current sleep level of the device selected in Step S806. In Step S808, the CPU 505 compares the sleep level checked in Step S807 with the sleep level of the device selected from the designated service table generated in Step S805, and checks whether or not the device is in a state capable of executing the service. In Step S808, if it has been determined that the device selected in Step S806 is at a service level at which the service can be executed (Yes in Step S808), the CPU 502 proceeds to Step S809. In Step S809, the CPU 502 requests that the selected device execute the service and ends the process. In this case, a device capable of executing a service without changing sleep level is selected as having the highest priority to provide the service.

If it has been determined in Step S808 that the device selected in Step S806 is not at a service level at which the service can be executed (No in Step S808), the CPU 502 proceeds to Step S810. In Step S810, the CPU 502 checks whether all of the devices included in the designated service table have been selected. If all of the devices have been selected (Yes in Step S810), the CPU 502 proceeds to Step S811. In Step S811, the CPU 502 reselects a device with the minimum power consumption to execute the service designated in the designated service table, and proceeds to Step S809.

In this case, because all devices capable of executing the designated service are in a sleep state in which execution of the service is not possible, a device with the minimum power consumption is caused to execute the service.

If it has been determined in Step S810 that all of the devices have not been selected (No in Step S810), the CPU 502 proceeds to Step S812. In Step S812, the CPU 502 selects a device with the next minimum power consumption from the designated service table, and returns to Step S807, where whether the selected device can execute the service is checked again.

Specific Example 1 of Power Conservation Service According to Present Embodiment The power conservation service of the present embodiment will be described through a specific example.

Here, it is assumed that the server apparatus 150 stores the service table of FIG. 6 and the power consumption table of FIG. 7. If the server apparatus 150 receives a request to execute a fax service without designating a device for executing the service, the CPU 502 of the server apparatus 150 creates a designated service table from the service table of FIG. 6 in Step S805 of FIG. 8.

In this case, a designated fax service table as shown in FIG. 9 is created. As shown in FIG. 9, the designated service table has the same columns as those of the service table of FIG. 6. Columns 901 to 905 of FIG. 9 correspond to the columns 601 to 605 of FIG. 6.

The designated fax service table of this example includes data items 606a and 606b of two devices. That is, it can be seen that the fax service is provided by machine 1 and machine 3, and their respective device models are device A and device C. In addition, in order to execute the service, both devices must be at sleep level "1". In this example, the device and the model have a one-to-one correspondence with each other, but it is of course possible that a plurality of devices are of the same model.

An example in which it is assumed that machine 1 and machine 3 are both currently at sleep level "2" will be described. In this case, a search is performed for a device with the minimum power consumption from the designated service table of FIG. 9, as a result of which machine 3 is selected. This determination is made as follows. First, because the model of machine 1 is device A, by checking the power consumption table of FIG. 7, it can be found that 800 W is required at sleep level "1", which is necessary to execute the fax service. Likewise, because the model of machine 3 is device C, it can be found that 600 W is required at the sleep level "1", which is necessary to execute the fax service. Accordingly, because the power consumption of machine 3 is smaller, machine 3 is selected.

The current sleep state of machine 3 is then checked. Because the sleep level is "2" as described above, the fax service cannot be executed in the current state. So, machine 1 with the next minimum power consumption is selected, and the current sleep state is similarly checked. But the sleep level of machine 1 is also "2", so the fax service cannot be executed. From this, it is found that, in either case, the fax service cannot be executed unless the sleep state is changed. So, machine 3 with the minimum power consumption to execute the fax service is selected, and an instruction to perform the fax service is issued to machine 3.

Another example in which it is assumed that the sleep level of machine 1 is 0, and the sleep level of machine 3 is 2 will be described. In this case as well, as in the above-described example in which the current sleep levels of machine 1 and machine 3 are sleep level "2", machine 3 is selected first. It is then found that machine 3 cannot execute the fax service in the current state. The operation up to here is the same as the above-described example. Then, machine 1 is selected, and the current service level of machine 1 is checked, as a result of which it is found that the current sleep level is "0", which means it is possible to execute the fax service. Then, an instruction to execute the fax service is issued to machine 1.

As described above, if a device capable of executing the service is found although the power consumption is not a minimum, the service is executed by using the device. With this configuration, it is possible to execute the service with an appropriate device with the minimum power consumption according to the sleep state of the device. That is, as described with reference to the flowchart of FIG. 8, in response to a request to execute a single service, a search is performed to find an optimal device with the minimum power consumption in consideration of the sleep state, and the service is executed. As described, according to the present embodiment, the services of a plurality of devices connected to the network are combined and provided.

A specific operation of FIG. 8 has been described through two examples here, but it is obvious that it is possible to provide an appropriate service taking power consumption and service speed into consideration by the procedure of FIG. 8 even when other assumptions are made.

Example 2 of Power Conservation Service when Workflow is Designated According to Present Embodiment Next, a method of selecting an optimal device with the minimum power consumption when a workflow in which a series of multiple services are sequentially executed is designated will be described.

"Workflow" as used herein refers to a series of multiple processes that are collectively performed in the following manner. For example, a user reads a paper document with the scanner of an image forming apparatus and prints out the document. Then, the document is transmitted to a designated address by fax, and the electronic document data read by the scanner is stored in a predetermined location of a file server. Such a series of multiple operations are registered with a single button in advance, and can be performed simply by the button being pushed by the user. Such a series of operations refers to a workflow, and individual operations represent the execution of each service.

As an example of an embodiment, a workflow is registered in the server apparatus 150, and the workflow registered in the server apparatus 150 is associated with a button in an image forming apparatus. When triggered by the user pressing the button, an instruction to start the workflow reaches the server apparatus 150, and the process starts. It is needless to say that the configuration for implementing a workflow is not limited to that described in the present embodiment, and any configuration can be employed as long as the content of the present invention is satisfied.

(Exemplary Configuration of Workflow Table)

FIG. 10 shows an example of a configuration of a workflow table showing device combinations that is created in this example.

A workflow table includes the following fields: a device list field 1001 in which device combinations for implementing the workflow are stored; a total power consumption field 1002 in which a total power consumption required by each combination stored in the device list is written; and a required power consumption field 1003 in which a required amount of electrical power excluding a device that has already been activated is stored. It should be noted that because there is a device that is capable of executing a plurality of services, the number of device combinations written in the device list does not necessarily match the number of services included in a workflow.

Exemplary Operation Procedure 2 of Power Conservation Service when Workflow is Designated According to Present Embodiment Next, an exemplary operation procedure for selecting an optimal device with the minimum power consumption when a workflow in which a series of multiple services are sequentially executed is designated will be described with reference to the flowchart of FIG. 11. The flowchart of FIG. 11 is stored in the ROM 504 or the HDD 505 of the server apparatus 150 of FIG. 5, and is executed by the CPU 502.

Figure 11:
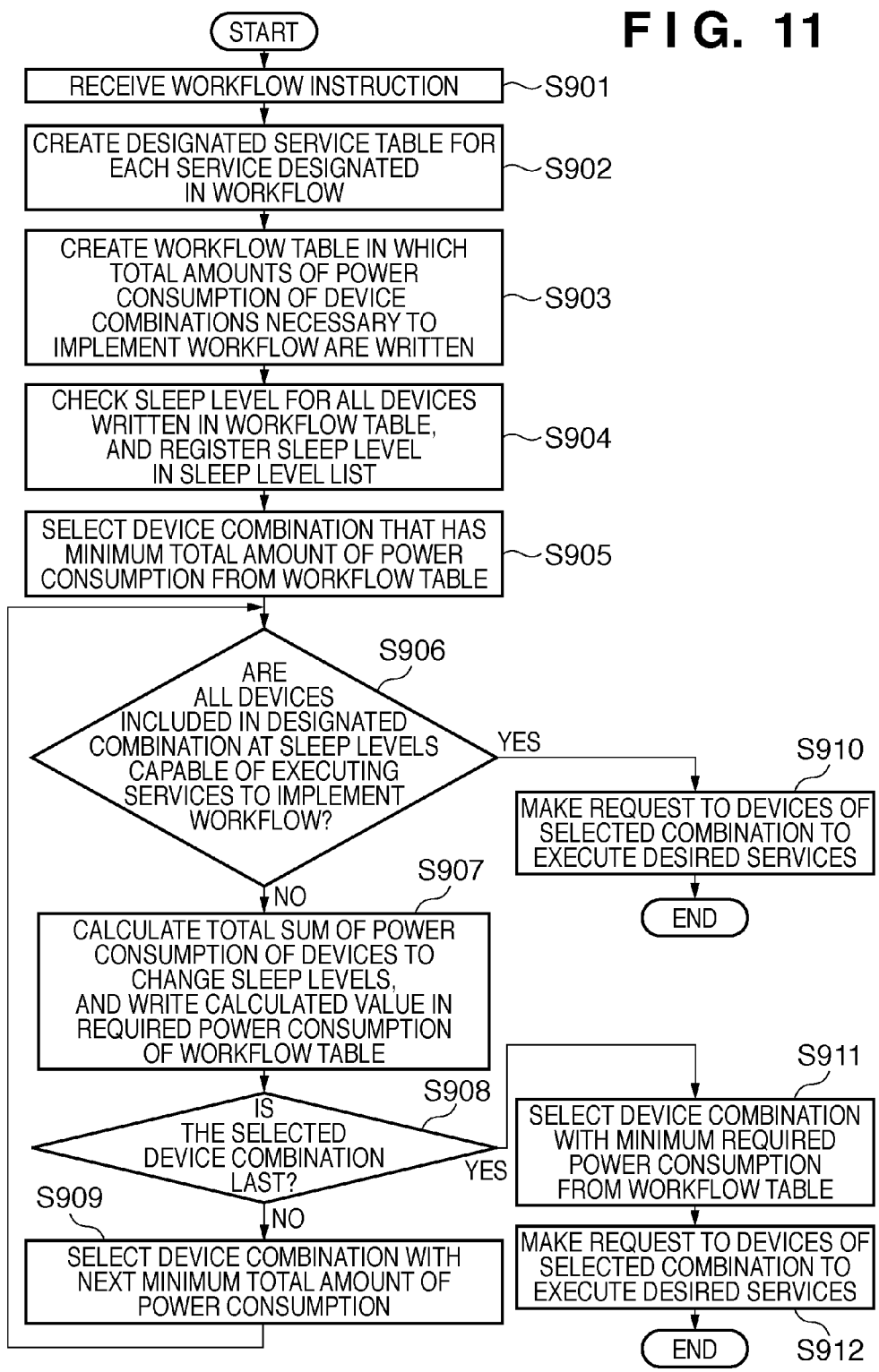
FIG. 11 is a flowchart showing an exemplary process procedure for selecting a combination of devices with the minimum power consumption to execute a received workflow and requesting that the devices execute the workflow according to an embodiment of the present invention.

In Step S901 of the flowchart of FIG. 11, the CPU 502 receives an instruction to execute a workflow from a client (e.g., an image forming apparatus or the like). In Step S902, the CPU 502 creates a designated service table for each service designated in the workflow. The designated service table is the same as that of FIG. 9, which was described in relation to Step S805, and such a table is generated for each of all the services designated in the workflow.

In Step S903, the CPU 502 obtains all device combinations necessary to implement the workflow from a service table as shown in FIG. 6. The CPU 502 calculates, for each obtained device combination, the total amount of power consumption required by the combination from a power consumption table as shown in FIG. 7. Then, all device combinations for implementing the workflow and the total amounts of power consumption for the device combinations are stored in a workflow table as shown in FIG. 10. In this manner, a workflow table in which the device list field 1001 and the total power consumption amount field 1002 are filled is created, a specific example of which will be described later with reference to FIG. 12.

Figure 13A:
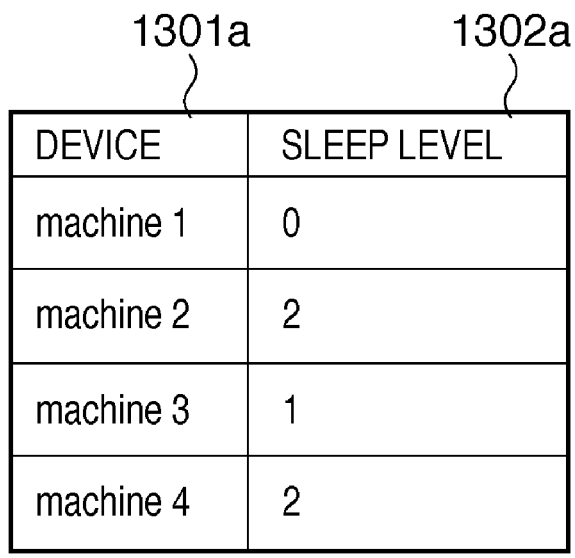
FIG. 13A is a diagram showing an example of a sleep level list used to illustrate a specific example of an embodiment of the present invention.
Figure 13B:
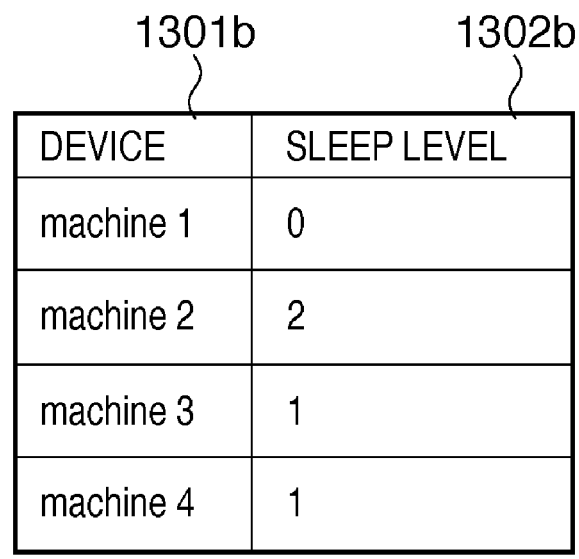
FIG. 13B is a diagram showing another example of a sleep level list used to illustrate a specific example of an embodiment of the present invention.

In Step S904, the CPU 502 checks the sleep level of each of all the devices included in the device list of the created workflow table, and creates a sleep level list that is a correspondence table between each device and the sleep level thereof. Specific examples of such a sleep level list are shown in FIGS. 13A and 13B. In Step S905, the CPU 502 selects a device combination that has a minimum value in the total power consumption field from the created workflow table. In Step S906, the CPU 502 checks whether all the devices included in the selected device combination have a sleep level for implementing a required service.

If the devices included in the selected combination have sleep levels at which all the services can be performed to implement the workflow, or in other words, if the workflow can be implemented without changing the sleep state of the selected devices (Yes in Step S906), the CPU 502 proceeds to Step S910. In Step S910, the CPU 502 requests that each device of the selected combination execute a desired service. This request may be performed primarily by the server apparatus 150, or by a mechanism in which workflow information in which devices to be requested are stored is transmitted and, after that, the workflow information is transferred to the next device after processing of a client device ends.

In Step S906, if even one device among all the selected devices is not at a sleep level at which a desired service can be implemented to implement the workflow (No in Step S906), the CPU 502 proceeds to Step S907. In Step S907, the CPU 502 calculates the total sum of the power consumption required to change the sleep state of devices included in the combination with a sleep state that needs to be changed to implement the workflow from the power consumption table stored on the HDD 505. Then, the CPU 502 stores the calculated value in the required power consumption field 1003 of the workflow table. In Step S908, the CPU 502 determines whether or not all device combinations have been selected from the workflow table. If all combinations have not been selected, the CPU 502 proceeds to Step S909. In Step S909, the CPU 502 selects a device combination with a total amount of power consumption smaller than that of the currently selected combination, and returns to Step S906. That is, when a desired workflow can be implemented with the processing from Step S906 to Step S910, without generating additional power consumption (without changing the sleep level), the workflow is implemented with a device combination with the minimum power consumption from among the device combinations.

If it has been determined in Step S908 that all device combinations of the workflow table have been selected (Yes in Step S908), the CPU 502 proceeds to Step S911. In Step S911, because the amount of power consumption required to change the sleep level to implement the workflow is written in the required power consumption field of the workflow table, the CPU 502 selects a device combination with the minimum required power consumption. If there are a plurality of device combinations with a minimum required power consumption, a device combination with the minimum total amount of power consumption is selected from among the device combinations. If they have the same total amount, an arbitrary device is selected. In Step S912, the CPU 502 makes a request to the devices of the combination selected in Step S911 to execute desired services, and ends the process.

Specific Example 2 of Power Conservation Service When Workflow is Designated According to Present Embodiment The power conservation service when a workflow is designated according to the present embodiment will be described through a specific example.

It is assumed that the server apparatus 150 stores the service table of FIG. 6 and the power consumption table of FIG. 7, and receives an instruction to execute a fax service and a send service as a workflow instruction. As used herein, the send service refers to a service in which an image is converted and transmitted to a file server or the like. It is also assumed here that devices for executing these services have not been designated.

A workflow table of FIG. 12 is generated through the processing of Step S903 of FIG. 11 from the service table of FIG. 6 and the power consumption table of FIG. 7. Because machine 1 and machine 3 provide a fax service, and machine 2 and machine 4 provide a send service, the following combinations are possible as device combinations that implement the services: "machine 1, machine 2", "machine 1, machine 4", "machine 2, machine 3" and "machine 3, machine 4". The total sum of power consumption required at the sleep levels at which a fax service and a send service can be executed is stored in the total power consumption field. For example, in the case of a combination "machine 1, machine 2", the sleep level at which device A executes a fax service is sleep level "1", and the sleep level at which device B executes a send service is sleep level "0". Accordingly, from the power consumption table of FIG. 7, the total power consumption can be calculated by adding 800 W and 650 W to obtain 1450 W (1.45 KW). Such calculation is similarly performed for other device combinations.

Next, processing will be described by way of two exemplary sleep level lists generated in Step S904 of FIG. 11 in which the current sleep level of each device is stored. FIGS. 13A and 13B show two exemplary sleep level lists. In the sleep level lists, all the devices listed in the device list of the workflow table are stored in columns 1301a and 1301b, and the sleep levels of the devices are stored in columns 1302a and 1302b.

(First Example of Sleep Level List)

An example in which the sleep level list that indicates the sleep level of each device is as shown in FIG. 13A will be described.

Figure 14:
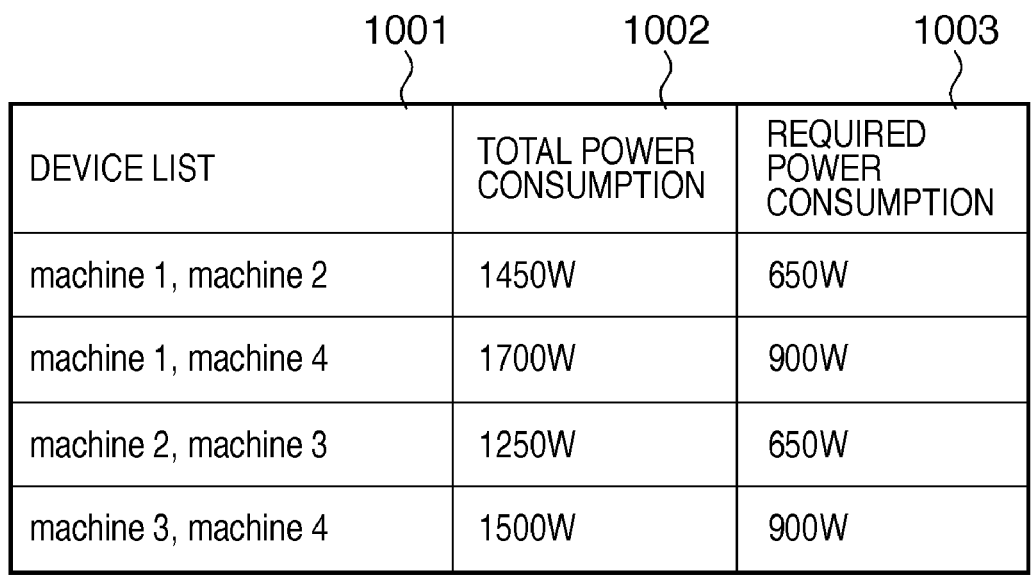
FIG. 14 is a diagram showing an example of a workflow table according to an embodiment of the present invention obtained after calculating required power consumption.

First, a combination "machine 2, machine 3" with the minimum total amount of power consumption, namely, 1250 W, is selected from the workflow table of FIG. 12. In this case, the sleep level of machine 2 is "2", so machine 2 cannot execute a send service. Accordingly, the power consumption required to change the sleep level of machine 2 is calculated from the power consumption table of FIG. 7 to be 650 W, and stored in the workflow table. Next, a combination "machine 1, machine 2" with the next minimum total amount of power consumption is selected. In this case as well, machine 2 cannot execute a send service, 650 W is stored as the required power consumption in the same manner as above. Furthermore, a combination "machine 3, machine 4" with the next minimum total amount of power consumption is selected. In this case, machine 4 cannot execute a send service, the power consumption required to change the sleep level of machine 4 is calculated from the power consumption table of FIG. 7 to be 900 W, and stored in the workflow table. Finally, a combination "machine 1, machine 4" is selected, but in this case as well, machine 4 cannot execute a send service, and the required power consumption is determined from the power consumption table of FIG. 7 to be 900 W, and stored in the workflow table. As a result, a workflow table as shown in FIG. 14 is obtained.

Because all combinations listed in the workflow of FIG. 12 have been checked, a combination with the minimum required power consumption is selected. In this example, the combinations "machine 1, machine 2" and "machine 2, machine 3" both have a minimum required power consumption of 650 W. However, the total amount of power consumption of "machine 2, machine 3" is 1250 W, which is smaller than that of "machine 1, machine 2", which is 1450 W. Accordingly, "machine 2, machine 3" is selected, and a request to execute the fax service is issued to machine 3, and a request to execute the send service is issued to machine 2.

(Second Example of Sleep Level List)

Another example in which the sleep level list is as shown in FIG. 13B will be described.

In this case, a combination "machine 2, machine 3" is selected first and a combination "machine 1, machine 2" is selected next in ascending order of the total amount of power consumption, but in either case, machine 2 cannot execute a send service. Then, a combination "machine 3, machine 4" with the next minimum total amount of power consumption is selected. Because both a fax service and a send service can be executed with this combination, requests to execute the respective services are sent to machine 3 and machine 4. As described above, services are executed by devices with a small power consumption according to the sleep state of the devices. As described with reference to the flowchart of FIG. 11, when a workflow is requested, in order to implement a plurality of required services, it is possible to select an optimal device combination with the minimum power consumption in consideration of the sleep state and execute the services to execute the workflow.

Example 3 of Power Conservation Service when Exceptional Service is Designated According to Present Embodiment Next, an operation performed when an exceptional service is designated according to the present embodiment will be described.

"Exceptional service" used herein refers to a service in which a specific device has been designated to execute the service and the service must be executed with the designated device. Examples of exceptional services include a print service that always designates an image forming apparatus installed in a location near the user's seat because the user wants to print with the nearby apparatus, a service that charges a fee to execute the service and that designates, for example, a device that provides a more inexpensive service although the processing speed is slow, and so on.

Figure 15A:
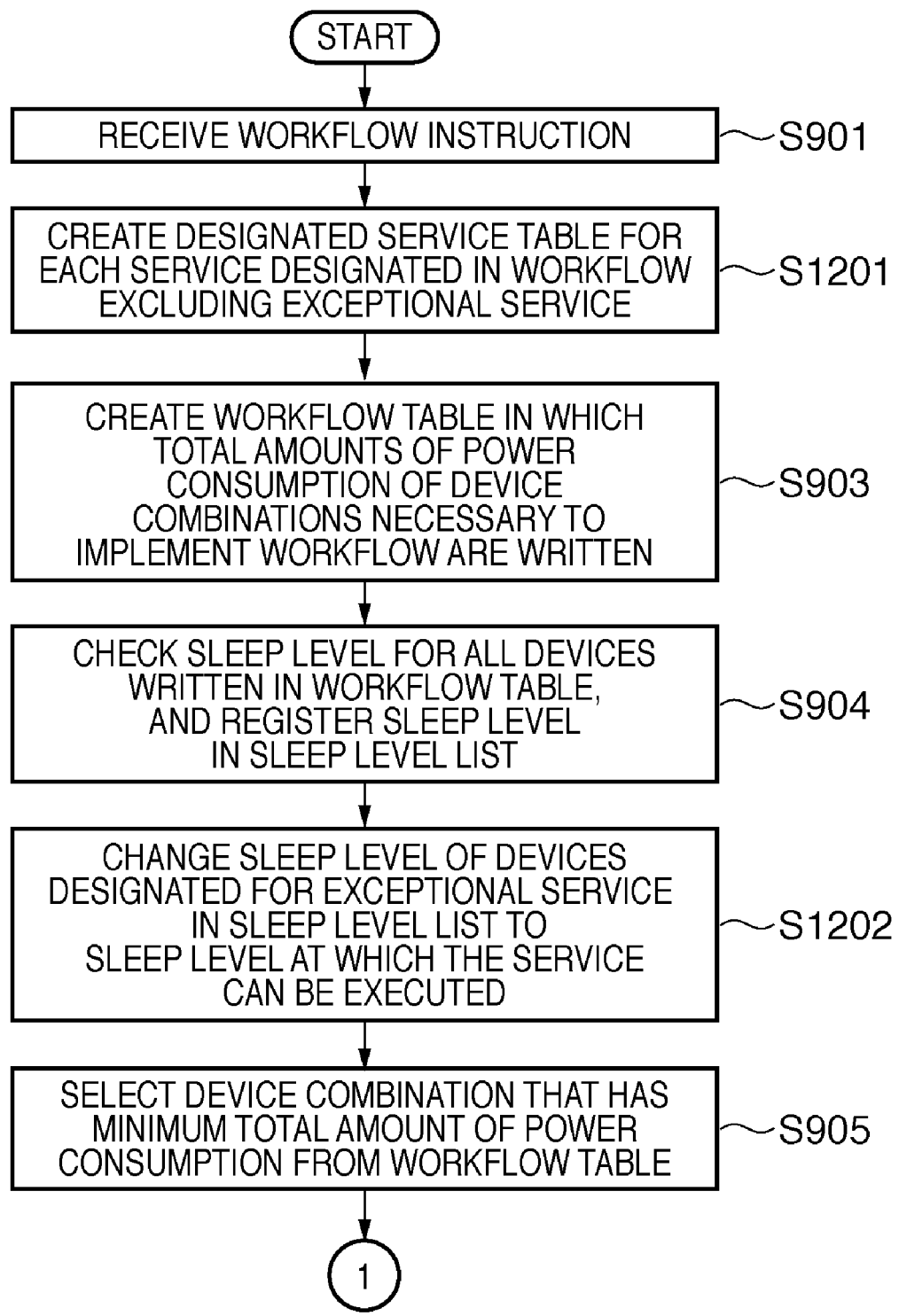
FIGS. 15A and 15B are a flowchart showing an exemplary process procedure for executing an exceptional service with a device designated for the exceptional service according to an embodiment of the present invention.
Figure 15B:
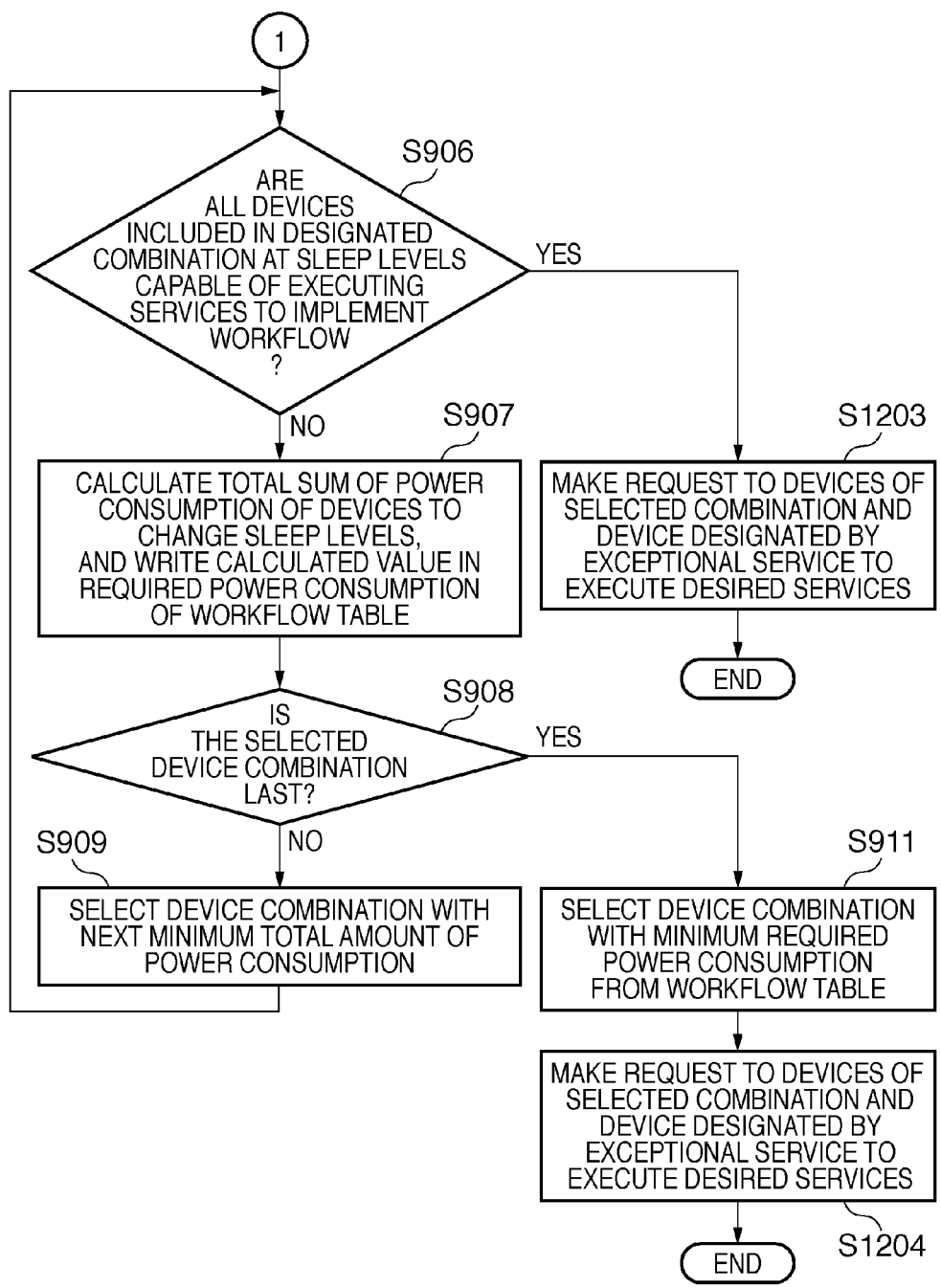

Exemplary Operation Procedure 3 of Power Conservation Service when Exceptional Service is Designated According to Present Embodiment The flowchart of FIGS. 15A and 15B is a flowchart obtained by incorporating the processing of an exceptional service into the flowchart when a workflow in which a series of multiple services are sequentially executed is designated, described with reference to the flowchart of FIG. 11. Accordingly, the same processing steps as those of the flowchart of FIG. 11 are given the same reference numerals as those of the flowchart of FIG. 11, and a description thereof is omitted here. For details, reference should be made to the description in relation to the same reference numerals of the flowchart of FIG. 11.

First, in Step S1201, in response to the workflow instruction received in Step S901, the CPU 502 creates designated service tables except for an exceptional service. Here, an exceptional service may be designated by a workflow instruction, or may be stored on the server apparatus 150 in advance. In the case where the server apparatus 150 stores an exceptional service, a mechanism may be employed in which an exceptional service is uniquely defined as an entire system, or a different exceptional service is stored for each user or the group to which each user belongs. In Step S1201, designated service tables except for an exceptional service are created and, as a result of the processing of Step S903 and Step S904, a workflow table and a sleep level list are created. The workflow table created in Step S903 does not include an exceptional service.

In Step S1202, the CPU 502 determines whether there is a device to execute the exceptional service designated by the workflow instruction among the devices stored in the sleep level list created in Step S904. If such a device is found, the sleep levels of all of such devices are changed to a sleep level at which the exceptional service can be executed. That is, the devices capable of executing the exceptional service included in the sleep level list are brought into a condition in which execution of the exceptional service is possible, whereby in the case where a service other than an exceptional service is provided by a device that can execute the exceptional service, the service can be executed without changing the sleep state.

In Step S905, the CPU 502 selects a device combination with the minimum total power consumption from the workflow table excluding the exceptional service created in Step S903. In Step S906, the CPU 502 checks whether the devices in the selected combination are at sleep levels at which all services excluding the exceptional service can be executed by referring to the consumption table. If the devices are at sleep levels at which all services can be executed (Yes in Step S906), the CPU 502 advances to Step S1203, where the CPU 502 requests that the selected devices and the device designated with the exceptional service execute respective desired services, and ends the process.

In Step S906, if it has been determined that no services can be executed at the current sleep level of the devices selected by the server apparatus, the CPU 502 advances to Step S907. The processing from Step S907 to Step S911 is the same as that of the flowchart of FIG. 11, so a description thereof is omitted here. In Step S1204, the CPU 502 requests that the devices selected in Step S911 and the device designated for the exceptional service execute respective desired services, and ends the process.

Specific Example 3 of Power Conservation Service When Exceptional Service is Designated According to Present Embodiment The power conservation service when an exceptional service is designated according to the present embodiment will be described through a specific example.

It is assumed that the server apparatus stores the service table FIG. 6 and the power consumption table of FIG. 7, and receives an instruction to execute a fax service and a print service as a workflow instruction. It is also assumed here that devices for executing the fax service have not been designated, but machine 1 has been designated to execute the print service as an exceptional service.

In Step S903 of FIG. 15A, a workflow table of FIG. 16 is created from the service table of FIG. 6 and the power consumption table of FIG. 7.

The total sums of power consumption required by device A and device C, which are the models of machine 1 and machine 3, at the sleep levels at which a fax service and a print service can be respectively executed are stored as total power consumption amounts. For example, when machine 1 is at sleep level 0, it can execute both a fax service and a print service. Accordingly, 1800 W is obtained from the power consumption table of FIG. 7. Likewise, in the case of a combination "machine 1, machine 3", the sleep level at which machine 1 executes a print service is sleep level 0, and the sleep level at which machine 3 executes a fax service is sleep level 1. Accordingly, 2400 W is obtained from the power consumption table of FIG. 7.

An example in which the sleep level list that indicates the sleep level of each device is as shown in FIG. 17A will be described. It is assumed here that machine 1 and machine 3 are currently at sleep level 2, but machine 1 has been designated to execute the print service as an exceptional service. Accordingly, machine 1 is expected to be brought to sleep level 0 at which the print service is reliably executed. Accordingly, in Step S1202 of FIG. 15A, processing is performed to change the sleep level list of FIG. 17A to a sleep level list of FIG. 17B. After this, the same processing as that described in relation to the specific example of the flowchart of FIG. 11 is performed, so a description there of is omitted here.

In this specific example, machine 1 is selected to execute the fax service and the print service without considering the required power consumption, but this is merely an example, and when more candidate devices are selected in the workflow table of FIG. 16, the required power consumption is also taken into consideration. As described with reference to the flowchart of FIGS. 15A and 15B, even when executing a specified exceptional service with a specified device, the transition of a device that executes an exceptional service to a sleep state in which the exceptional service is executed is considered. Then, an optimal device combination with the minimum power consumption is selected to execute the services, thereby executing the workflow.

Example 4 of Power Conservation Service that Presents Alternative Schema to User According to Present Embodiment In the present embodiment, an example in which even when an exceptional service is designated, if the service can be executed with less power consumption by another combination, a user is notified of the fact will be described.

For example, even when a nearby image forming apparatus has been designated for printing as an exceptional service, if power consumption can be reduced through outputting through a remote image forming apparatus, an alternative schema is presented to the user to ask him/her about it. If the user accepts the alternative schema, the workflow can be executed by a device combination that uses less power consumption.

Figure 18B:
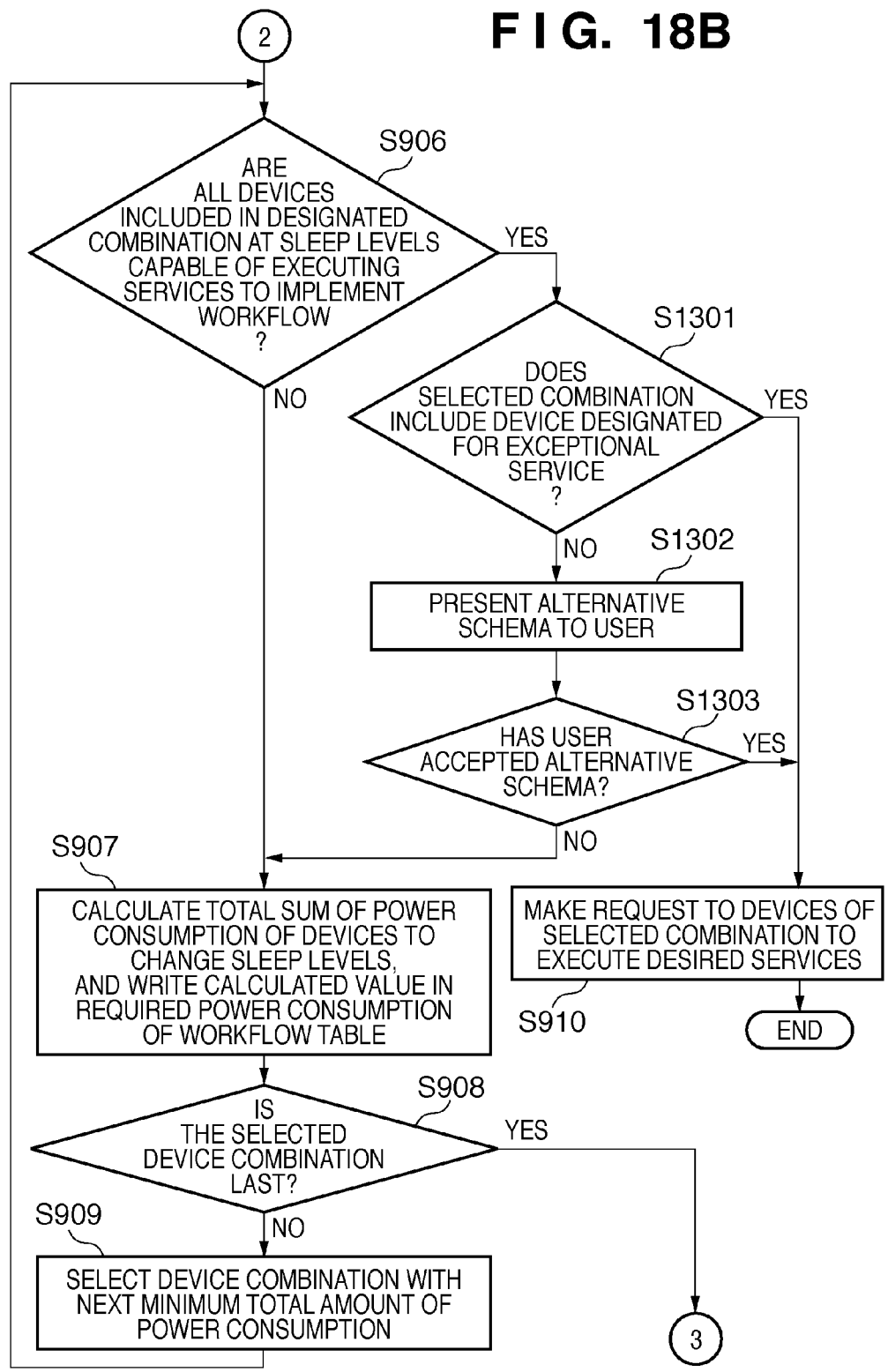

Exemplary Operation Procedure 4 of Power Conservation Service that Presents Alternative Schema to User According to Present Embodiment The flowchart of FIGS. 18A-18C is a flowchart obtained by incorporating the processing of presenting an alternative schema to a user into the flowchart when a workflow in which a series of multiple services are sequentially executed is designated, described with reference to the flowchart of FIG. 11. Accordingly, the same processing steps as those of the flowchart of FIG. 11 are given the same reference numerals as those of the flowchart of FIG. 11, and a description thereof is omitted here. For details, reference should be made to the description in relation to the same reference numerals of the flowchart of FIG. 11.

The processing from Step S901 to Step S905 is the same as that of the flowchart of FIG. 11. This flowchart handles an exceptional service, but presents an alternative schema to the user, in which point this flowchart differs from the flowchart of FIGS. 15A and 15B. In Step S906, the CPU 502 determines whether the devices of the selected combination are at sleep levels at which the workflow can be implemented. The workflow table used in this flowchart includes an exceptional service as well. Accordingly, a selected device combination may not necessarily include a device designated by an exceptional service.

If the CPU 502 has determined in Step S906 that the workflow can be executed with the selected device (Yes in S906), the CPU 502 advances to Step S1301. In Step S1301, the CPU 502 checks whether the selected combination includes a device designated for the exceptional service. If the selected combination includes a device designated for the exceptional service (Yes in Step S1301), the CPU 502 advances to Step S910, where the CPU 502 requests that the devices of the selected combination execute desired services and ends the process. This is the case where because the selected combination includes a device designated for the exceptional service, it is unnecessary to provide an alternative schema to the user.

If the CPU 502 has determined in Step S1301 that the selected combination does not include a device designated for the exceptional service (No in Step S1301), the CPU 502 advances to Step S1302. In Step S1302, the CPU 502 presents an alternative schema to the user indicating that power consumption can be reduced by executing the exceptional service with another device (a device included in the currently selected combination). This is performed by issuing an instruction to display such a message to the device that has requested execution of the workflow. In Step S1303, the CPU 502 receives a response indicating whether or not to accept the alternative schema from the user from the device that has requested execution of the workflow and makes a determination. Upon receipt of a result from the user indicating that the alternative schema has been accepted by the CPU 502 (Yes in Step S1303), the CPU 502 proceeds to Step S910, where the CPU 502 requests that the devices of the selected combination execute desired services and ends the process. In Step S1303, upon receipt of a result from the user indicating that the alternative schema has not been accepted by the CPU 502 (No in Step S1303), the CPU 502 proceeds to Step S907, where the CPU 502 selects another combination.

The processing from Step S907 to Step S909 and that of Step S911 are the same as those of the flowchart of FIG. 11, so a description thereof is omitted here.

In Step S1304 of FIG. 18C, the CPU 502 checks whether the selected combination includes a device designated for the exceptional service. If the selected combination includes a device designated for the exceptional service (Yes in Step S1304), the CPU 502 advances to Step S912, where the CPU requests that the devices of the selected combination execute desired services and ends the process. This is the case where because the selected combination includes a device designated for the exceptional service, it is unnecessary to provide an alternative schema to the user.

If the CPU 502 has determined in Step S1304 that the selected combination does not include a device designated for the exceptional service (No in Step S1304), the CPU 502 advances to Step S1305. In Step S1305, the CPU 502 presents an alternative schema to the user indicating that power consumption can be reduced by executing the exceptional service with another device (a device included in the currently selected combination). This is performed by issuing an instruction to display such a message to the device that has requested execution of the workflow. In Step S1306, the CPU 502 receives a response indicating whether or not to accept the alternative schema from the user from the device that has requested execution of the workflow and makes a determination. Upon receipt of a result from the user indicating that the alternative schema has been accepted by the CPU 502 (Yes in Step S1306), the CPU 502 advances to Step S912, where the CPU requests that the devices of the selected combination execute desired services and ends the process.

In Step S1306, upon receipt of a result from the user indicating that the alternative schema has not been accepted by the CPU 502 (No in Step S1306), the CPU 502 advances to Step S1307. In Step S1307, the CPU 502 recalculates the required power consumption of a combination that includes a device specified for the exceptional service within the workflow table assuming that it is at a service level necessary to execute services with the devices, whereby even when another service is executed by a device that executes the exceptional service, a combination with a minimum power consumption can be selected. In Step S1308, the CPU 502 selects a combination with a minimum required power consumption recalculated in Step S1307 from among the combinations that include a device designated for the exceptional service of the workflow that are listed in the workflow table. If there are a plurality of combinations with a minimum required power consumption recalculated in Step S1307, a combination with the minimum total amount of power consumption is selected. If they have the same total amount of power consumption, an arbitrary device is selected.

Specific Example 4 of Power Conservation Service that Presents Alternative Schema to User According to Present Embodiment The power conservation service that presents an alternative schema to a user according to the present embodiment will be described through a specific example.

It is assumed that the server apparatus stores the service table of FIG. 6 and the power consumption table of FIG. 7, and receives an instruction to execute a fax service and a print service as a workflow instruction. It is also assumed here that devices for executing the fax service have not been designated, but machine 4 has been designated to execute the print service as an exceptional service.

A worktable created in Step S903 without the designation of an exceptional service is as shown in FIG. 19. Referring to a combination "machine 1, machine 3" in FIG. 19, (F) and (P) are written. This means that a device with (F) provides a fax service and a device with (P) provides a print service. If the exceptional service is executed as designated, a combination indicated by reference numeral 2801 or 2802 in FIG. 19 is selected. In this case, a large amount of power consumption is required when machine 4 is not in a state in which it can execute a print service.

For example, if the sleep level list is as shown in FIG. 20, machine 4 cannot execute a print service. A combination "machine 2, machine 3" with the minimum total power consumption is selected from the workflow table of FIG. 19. The machine 2 is in a state it which it can execute a print service, and machine 3 is in a state in which it can execute a fax service. However, machine 4 has been designated to execute the print service with the exceptional service.

Accordingly, the server apparatus notifies the user that power consumption is less when executing the print service by using machine 2 rather than machine 4, and checks with the user whether or not to accept such a change. If the user accepts changing the device to execute the print service, the print service is executed by machine 2. If the user does not accept the change, in the same manner as above, the server apparatus selects another combination, notifies the user that power consumption is less when executing the print service by using another device than when executing it by using machine 4, and checks with the user. The user, however, may find it inconvenient if he/she is repeatedly asked. Accordingly, an option to not show any more inquiries, or a configuration that allows the user to check only once by showing all combinations in advance and presenting all alternate devices may be provided.

As described with reference to the flowchart of FIGS. 18A-18C, even when a specified device has been designated to execute a specified exceptional service, it is possible to incorporate the processing of presenting an alternative schema to the user, whereby the workflow can be executed by selecting a device combination that uses less power consumption.

Example 5 of Power Conservation Service Considering Entire Workflow According to Present Embodiment The foregoing description has discussed the method of selecting a device with the minimum power consumption to execute a single workflow. However, there are cases where, when the server apparatus 150 receives a plurality of workflows in close succession, because it cannot keep up with the incoming workflows, the server apparatus 150 enqueues the workflow instructions to temporarily store the workflows and executes the workflows. In such a case, it is efficient to select devices such that the power consumption is reduced to a minimum for the entirety of the plurality of enqueued workflows, rather than a single workflow. Accordingly, a method of selecting a device combination such that the power consumption is reduced to a minimum for the entirety of a plurality of enqueued workflows will be described now.

Figure 21:
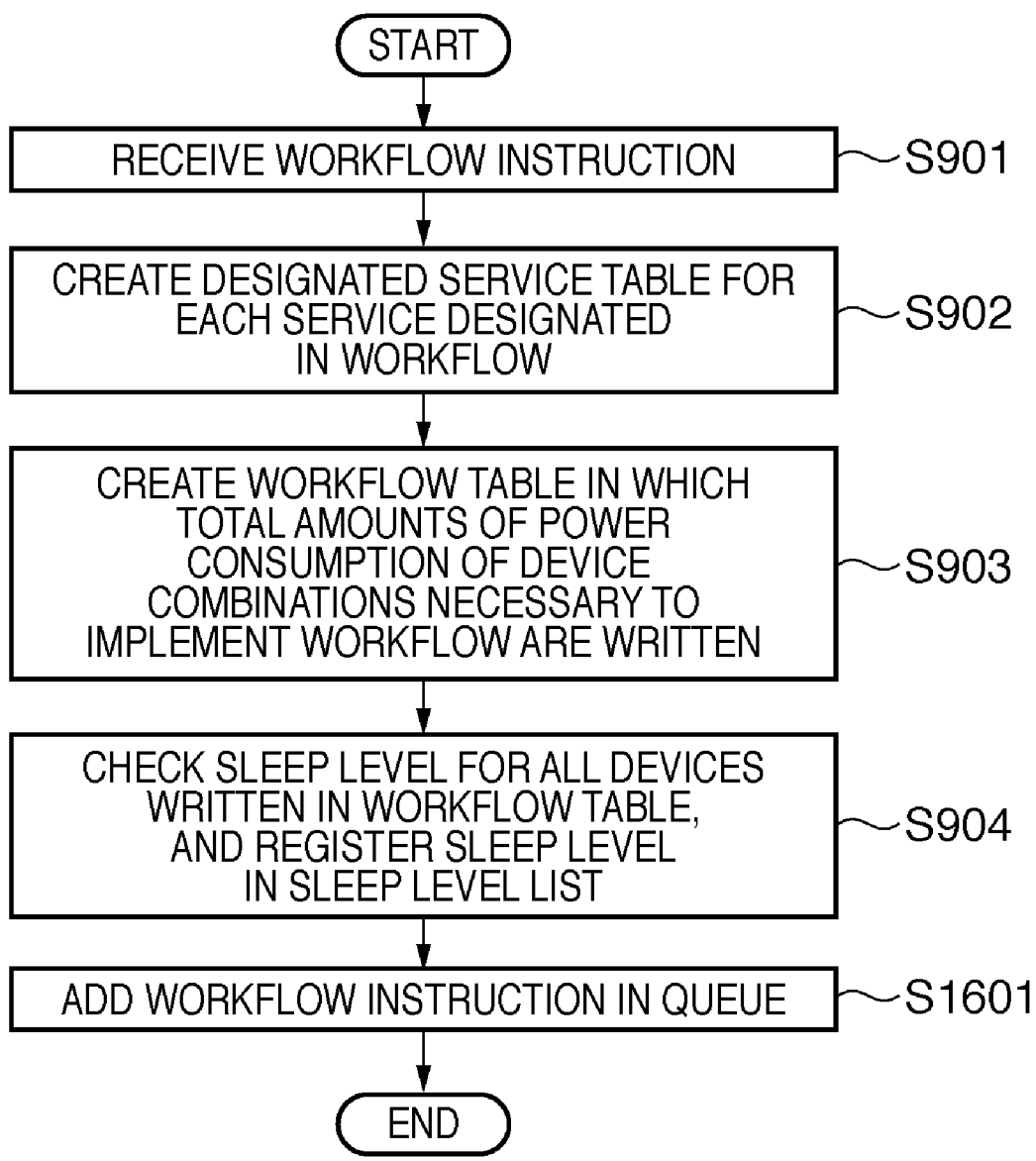
FIG. 21 is a flowchart showing an exemplary procedure for enqueuing a received workflow in the case of enqueuing a plurality of workflows according to an embodiment of the present invention.

Exemplary Operation Procedure 5 of Power Conservation Service Considering Entire Workflow According to Present Embodiment The flowchart of FIG. 21 illustrates a process for enqueuing workflow instructions performed by the server apparatus 150. This flowchart is obtained by modifying the flowchart of FIG. 11 so as to cope with the enqueuing of a plurality of workflows. Accordingly, the same processing steps as those of the flowchart of FIG. 11 are given the same reference numerals as those of the flowchart of FIG. 11, and a description thereof is omitted here. For details, reference should be made to the description in relation to the same reference numerals of the flowchart of FIG. 11.

The processing from Step S901 to Step S904 is the same as that of the flowchart of FIG. 11, but the workflow table and the sleep level list are shared by all enqueued workflows. Accordingly, when there is already a workflow, the workflow table generation of Step S903 and the sleep level list registration of Step S904 are performed by adding the total power consumption information and the sleep level information to the workflow table and the sleep level list, respectively.

As shown in FIG. 22, a field 1501 that indicates a corresponding workflow is added to the workflow table. In the workflow table generation of Step S903, the identifier (e.g., name, ID or the like) of a selected workflow is stored in this field. In FIG. 22, W1, W2 and so on are written. A plurality of workflows can be stored when there is a combination of the same devices.

In Step S1601, the workflow instruction that has been added to the workflow table and the sleep level list is added in a queue, and the process ends. This flowchart ends because it is for enqueuing, and execution of a workflow is described with reference to the next flowchart shown in FIG. 23.

Figure 23:
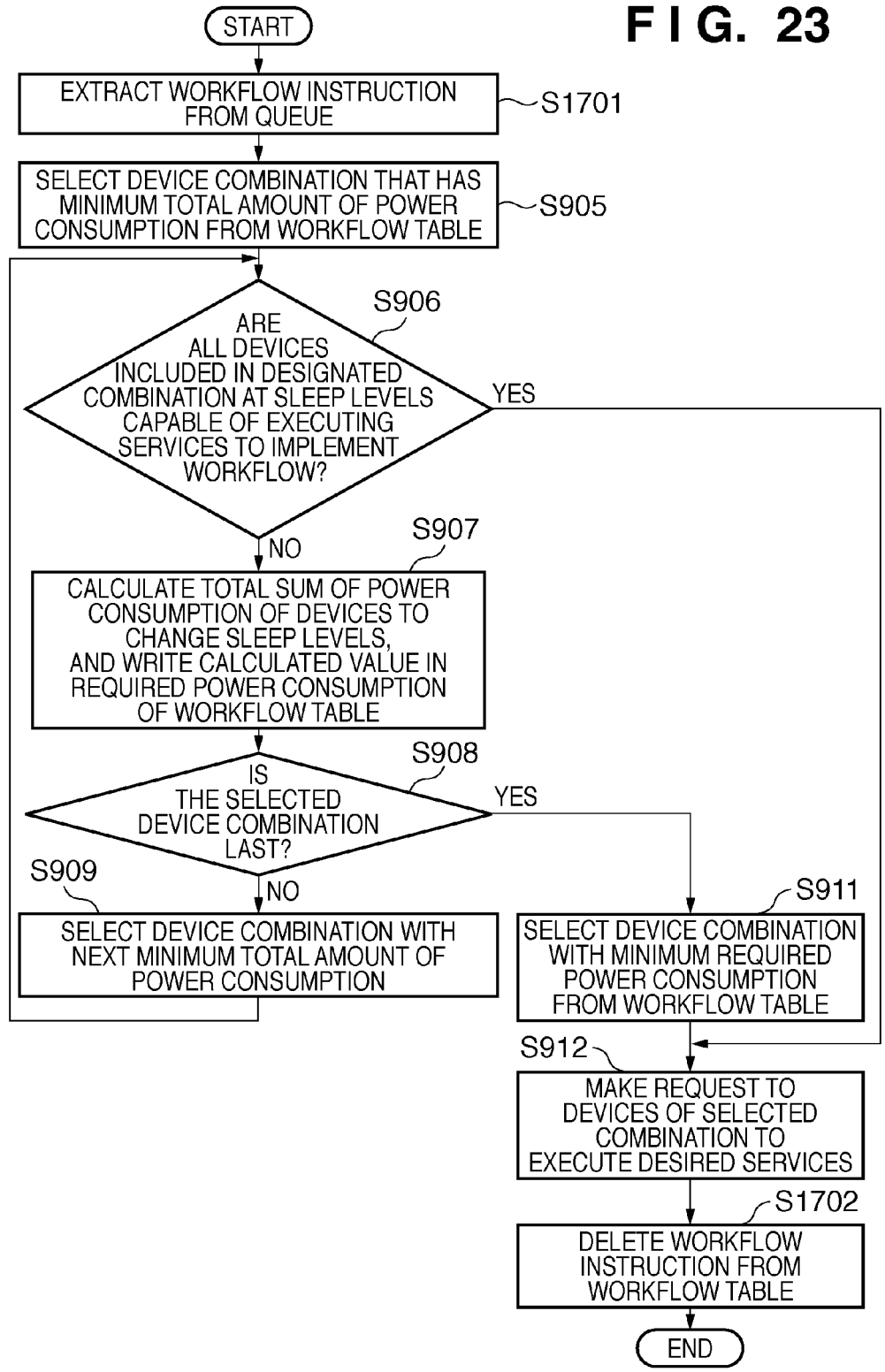
FIG. 23 is a flowchart showing an exemplary procedure for extracting a workflow from a queue and determining a device combination to execute the workflow in the case of enqueuing a plurality of workflows according to an embodiment of the present invention.

The flowchart of FIG. 23 shows a process for extracting a workflow instruction from the queue and executing the workflow such that power consumption is reduced to a minimum for all the entire enqueued workflows. As in the flowchart of FIG. 21, this flowchart is obtained by modifying the flowchart of FIG. 11 so as to cope with the enqueuing of a plurality of workflows. Accordingly, the same processing steps as those of the flowchart of FIG. 11 are given the same reference numerals as those of the flowchart of FIG. 11, and a description thereof is omitted here. For details, reference should be made to the description in relation to the same reference numerals of the flowchart of FIG. 11. In addition, the workflow table and the sleep level list are shared by all enqueued workflows as in the flowchart of FIG. 21.

In Step S1701, the CPU 502 extracts a workflow instruction from the queue. Which workflow instruction is extracted from the queue is not essential to the principle of the present invention, so a workflow may be executed in the stored order, or the CPU 502 may select a workflow determined to be optimal by the CPU 502. The processing from Step S906 to Step S909 and that of Step S911 are the same as those of the same reference numerals of the flowchart of FIG. 11.

In Step S906, if it is possible to execute the workflow at the service levels of the devices of the selected combination (Yes in Step S906), the CPU 502 proceeds to Step S912. In Step S912, the CPU 502 requests that the devices of the selected combination execute the services, and the CPU 502 advances to Step S1702. In Step S1702, the CPU 502 deletes the workflow instruction from the workflow table. If the workflow field is empty at this time, the combination is deleted. For example, in FIG. 22, when a workflow W2 ends, for device combinations "machine 1, machine 3" and "machine 4, machine 7" of the device list, W2 is deleted. However, because W1 remains for the device combination "machine 1, machine 3", "machine 1, machine 3" is not deleted. On the other hand, the device combination "machine 4, machine 7" is deleted from the workflow table because there is no other workflow for "machine 4, machine 7", and the process ends.

As described with reference to the flowcharts of FIGS. 21 and 23, it is possible to select a device combination such that power consumption is reduced to a minimum for the entirety of a plurality of workflows stored in the queue of the server apparatus 150, rather than a single workflow, whereby the workflows can be executed individually in consideration of the power consumption for the entire workflows.

Other Embodiments

As another embodiment, a configuration is possible that selects an optimal device by calculating the power consumption based on the actual processing content. When operating the workflow table, a total amount of power consumption and a required power consumption are obtained in consideration of the processing content. For example, it is assumed that, when there is a print service provided by an image forming apparatus, there is an apparatus to execute the print service at a high speed but consumes a large amount of power and an apparatus to execute the print service at a low speed but consumes a small amount of power. If the number of pages to be printed is small, power consumption would be smaller by printing with the low-speed apparatus. If the number of pages to be printed is large, there is a case where power consumption would be smaller in total by printing with the high-speed apparatus. Accordingly, the power consumption amount may be obtained in consideration of the processing content and the processing capability. This can be performed by using the information written under the performance column 605 of FIG. 6. That is, the power consumption may be obtained from the processing content by using the performance written in FIG. 6.

An example in which the present embodiment is implemented in the case of the flowchart of FIG. 11 will be described. In Step S903, the server apparatus 150 obtains all device combinations necessary to implement the workflow. The processing up to here is the same. The server apparatus 150 further calculates, for each of the obtained device combinations, a total amount of power consumption required by the combination from the processing content of the services of the workflow and the power consumption table. Then, the server apparatus 150 stores device combinations for implementing all services of the workflow and the total amount of power consumption in the workflow table. Through execution of another processing of the flowchart of FIG. 11 based on this workflow table, the power consumption is calculated based on the actual processing content of the services of the workflow, and an optimal device can be selected.

Thus far, various embodiments have been described in detail, but the present invention may be applied to a system comprising a plurality of devices, or may be applied to an apparatus comprising a single device, such as, for example, a scanner, a printer, a PC, a copy machine, a multifunction peripheral, a facsimile device, and so on.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-321478 filed on Dec. 17, 2008, which is hereby incorporated by reference herein in its entirety.

What is claimed is:

1. An information processing apparatus for controlling services provided by a plurality of devices connected to a network, the apparatus comprising:

a service table that stores a combination of a service provided via the network and a device connected to the network and providing the service;

a power consumption table that stores a device connected to the network and power consumption of the device;

a service reception unit configured to receive a request of a service provided by a device connected to the network;

a sleep check unit configured to check whether or not the device connected to the network and providing the requested service is in a sleep state;

a device search unit configured to select a device to be used based on the sleep state of the device checked by the sleep check unit, the service table and the power consumption table under a condition of a time until the service is provided and power consumption of the selected device; and a service instruction unit configured to issue an instruction of providing the service to the device connected to the network and selected by the device search unit, wherein said device search unit preferentially selects, as devices to be used, a combination of devices connected to the network but not needing a change to the sleep state level, and wherein said device search unit preferentially selects, as devices to be used, a combination of devices connected to the network and having a minimum sum of power consumption of the devices providing the services, when it is necessary to change the sleep state level.

2. The information processing apparatus according to claim 1, wherein said service reception unit receives a request of a service provided by a combination of a plurality of devices connected to the network, and the information processing apparatus further comprises a device combination unit configured to create a combination of devices connected to the network and implementing the received request of the service provided by a combination of the plurality of devices, and wherein said sleep check unit checks whether or not a combination of devices connected to the network and capable of implementing the requested service are in a sleep state, said device search unit selects devices to be used based on the sleep states of the devices connected to the network checked by said sleep check unit, the service table and the power consumption table under conditions of a time until the service is provided and power consumption of the selected devices, and said service instruction unit issues an instruction of providing the service to the combination of devices connected to the network and selected by said device search unit.

3. The information processing apparatus according to claim 2, wherein said service reception unit further receives information designating a device that provides at least part of a received service, said sleep check unit checks whether or not the combination of devices connected to the network and capable of implementing the requested service except for the designated device are in a sleep state, said device search unit selects devices other than the designated device to be used based on the sleep states of the devices connected to the network checked by said sleep check unit, the service table and the power consumption table under conditions of a time until the service is provided and power consumption of the selected devices, and said service instruction unit issues an instruction of providing the service to the designated device and the combination of devices connected to the network and selected by said device search unit.

4. The information processing apparatus according to claim 3, further comprising:

a determination unit configured to determine whether or not the designated device is included in the devices connected to the network and selected by said device search unit; and an inquiry unit configured to issue an inquiry as to whether or not to accept an alternative to replace the designated device with a device providing the same service of devices connected to the network and selected by said device search unit, when said determination unit has determined that the designated device is not included, wherein said service instruction unit issues an instruction of providing the service to the combination of devices connected to the network and selected by said device search unit without using the designated device when the alternative has been accepted.

5. The information processing apparatus according to claim 1, wherein said service reception unit receives a request of a plurality of services, and said device search unit selects a device to be used based on the sleep state of the device checked by said sleep check unit, the service table and the power consumption table under conditions of a time until the plurality of services are provided and power consumption of the selected device.

6. The information processing apparatus according to claim 1, wherein the service table stores at least a device providing the service and a sleep state level at which the service can be provided associated with every processing content of each service, and the power consumption table stores power consumption associated with every sleep state level of each device.

7. The information processing apparatus according to claim 1, wherein the service table further stores device performance or capability, and the power consumption is obtained from processing content designated by the request of service and the performance or capability in the service table.

8. A method of assigning a service to be provided to a plurality of devices connected to a network, the method comprising:

a step of preparing a service table that stores a combination of a service provided via the network and a device connected to a network and providing the service, and a power consumption table that stores a device connected to the network and power consumption of the device;

a service reception step of receiving a request of a service provided by a device connected to the network;

a sleep check step of checking whether or not the device connected to the network and providing the requested service is in a sleep state;

a device search step of selecting a device to be used based on the sleep state of the device checked in said sleep check step, the service table and the power consumption table under conditions of a time until the service is provided and power consumption of the selected device; and a service instruction step of issuing an instruction of providing the service to the device connected to the network and selected in said device search step, wherein in said device search step, a combination of devices connected to the network but not needing a change to the sleep state level is preferentially selected as devices to be used, and wherein in said device search step, a combination of devices connected to the network and having a minimum sum of power consumption of the devices to provide the services is preferentially selected as devices to be used, when it is necessary to change the sleep state level.

9. The method of assigning a service according to claim 8, wherein in said service reception step, a request of services provided by a combination of a plurality of devices connected to the network, the method further comprises a device combination step of creating a combination of devices connected to the network and implementing the received request of services provided by a combination of the plurality of devices, in said sleep check step, it is checked whether or not a combination of devices connected to the network and capable of implementing the requested services are in a sleep state, in said device search step, devices to be used are selected based on the sleep states of the devices connected to the network checked in said sleep check step, and the service table and the power consumption table under conditions of a time until the service is provided and power consumptions of the selected devices, and in said service instruction step, an instruction of providing the service is issued to the combination of devices connected to the network and selected in said device search step.

10. The method of assigning a service according to claim 9, wherein in said service reception step, information designating a device that provides at least part of received service, in said sleep check step, it is checked whether or not the combination of devices connected to the network and capable of implementing the requested service except for the designated device are in a sleep state, in said device search step, devices other than the designated device are selected to be used based on the sleep states of the devices connected to the network checked in said sleep check step, the service table and the power consumption table under conditions of a time until the service is provided and power consumption of the selected devices, and in said service instruction step, an instruction providing the service is issued to the designated device and the combination of devices connected to the network and selected in said device search step.

11. The method of assigning a service according to claim 10, further comprising:

a determination step of determining whether or not the designated device is included in the devices connected to the network and selected in the device search step; and an inquiry step of issuing an inquiry as to whether or not to accept an alternative to replace the designated device with a device providing the same service connected to the network and selected in the device search step, when it has been determined in the determination step that the designated device is not included, wherein in said service instruction step, an instruction providing the service is issued to the combination of devices connected to the network and selected in the device search step without using the designated device when the alternative has been accepted.

12. The method of assigning a service according to claim 8, wherein in said service reception step, a request of a plurality of services is received, and in said device search step, a device to be used is selected based on the sleep state of the device checked in the sleep check step, the service table and the power consumption table under conditions of a time until the plurality of services are provided and power consumption of the selected device.

13. The method of assigning a service according to claim 8, wherein the service table stores at least a device providing the service and a sleep state level at which the service can be provided associated with every processing content of each service, and the power consumption table stores power consumption associated with every sleep state level of each device.

14. The method of assigning a service according to claim 8, wherein the service table further stores device performance or capability, and the power consumption is obtained from processing content designated by the request of service and the performance or capability in the service table.

15. A non-transitory computer-readable storage medium which stores a program for causing a computer to execute a method of assigning a service to be provided to a plurality of devices connected to a network, the method comprising:

a step of preparing a service table that stores a combination of a service provided via the network and a device connected to a network and providing the service, and a power consumption table that stores a device connected to the network and power consumption of the device;

a service reception step of receiving a request of a service provided by a device connected to the network;

a sleep check step of checking whether or not the device connected to the network and providing the requested service is in a sleep state;

a device search step of selecting a device to be used based on the sleep state of the device checked in said sleep check step, the service table and the power consumption table under condition s of a time until the service is provided and power consumption of the selected device; and a service instruction step of issuing an instruction of providing the service to the device connected to the network and selected in said device search step, wherein in said device search step, a combination of devices connected to the network but not needing a change to the sleep state level is preferentially selected as devices to be used, and wherein in said device search step, a combination of devices connected to the network and having a minimum sum of power consumption of the devices to provide the services is preferentially selected as devices to be used, when it is necessary to change the sleep state level.

* * * * *